(12) United States Patent
Ohara et al.

(10) Patent No.: US 12,248,428 B2
(45) Date of Patent: Mar. 11, 2025

(54) INFORMATION PROCESSING SYSTEM, INFORMATION PROCESSING METHOD AND PROGRAM

(71) Applicant: NIPPON TELEGRAPH AND TELEPHONE CORPORATION, Tokyo (JP)

(72) Inventors: Takuya Ohara, Musashino (JP); Takuya Oda, Musashino (JP); Fumikazu Inuzuka, Musashino (JP); Takafumi Tanaka, Musashino (JP); Masayuki Shimoda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/025,129

(22) PCT Filed: Sep. 14, 2020

(86) PCT No.: PCT/JP2020/034759
§ 371 (c)(1),
(2) Date: Mar. 7, 2023

(87) PCT Pub. No.: WO2022/054291
PCT Pub. Date: Mar. 17, 2022

(65) Prior Publication Data
US 2024/0028552 A1    Jan. 25, 2024

(51) Int. Cl.
*G06F 13/00* (2006.01)
*G06F 15/17* (2006.01)
*H04B 1/38* (2015.01)

(52) U.S. Cl.
CPC .............. *G06F 15/17* (2013.01); *H04B 1/38* (2013.01)

(58) Field of Classification Search
None
See application file for complete search history.

(56) References Cited

U.S. PATENT DOCUMENTS 6,678,524 B1   1/2004  Hansson et al.
6,914,972 B1   7/2005  Baumeister et al.
(Continued)

FOREIGN PATENT DOCUMENTS

EP    3041311 A1    7/2016
JP    10-117215 A   5/1998
(Continued)

OTHER PUBLICATIONS

Ramesh Govindan et al., "An Architecture for Stable, Analyzable Internet Routing", IEEE Network, vol. 13, issue 1, pp. 29-35, 1999.
(Continued)

*Primary Examiner* — Henry Tsai
*Assistant Examiner* — Dean Phan

(57) ABSTRACT

One aspect of the present invention is an information processing system including a computer installed in a computer base, a first transceiver connected to the computer, a second transceiver installed in a user base used by a user, a device connected to the second transceiver, a network configured to perform communication between a plurality of the first transceivers and the second transceiver, and a controller configured to control connection between one of the plurality of the first transceivers and the second transceiver, in which the controller is configured to control connection between one of the plurality of the first transceivers and the second transceiver via the network having a circuit switching function.

5 Claims, 20 Drawing Sheets

(56) References Cited

U.S. PATENT DOCUMENTS

| | | | |
|---|---|---|---|
| 7,519,049 B2 | 4/2009 | Masuda | |
| 7,822,065 B2 | 10/2010 | Lu | |
| 8,719,534 B1* | 5/2014 | Ray, III | G06F 3/0622 |
| | | | 711/E12.093 |
| 9,141,420 B2 | 9/2015 | Chang et al. | |
| 9,146,769 B1 | 9/2015 | Shankar et al. | |
| 9,785,478 B1 | 10/2017 | Babu B R et al. | |
| 11,089,105 B1 | 8/2021 | Karumbunathan et al. | |
| 11,301,407 B2 | 4/2022 | Sen et al. | |
| 2003/0184651 A1 | 10/2003 | Ohsawa et al. | |
| 2006/0171713 A1 | 8/2006 | Feng | |
| 2007/0079307 A1 | 4/2007 | Dhawan et al. | |
| 2008/0235361 A1 | 9/2008 | Crosbie et al. | |
| 2009/0240790 A1* | 9/2009 | Utsunomiya | H04L 63/0272 |
| | | | 709/221 |
| 2010/0042636 A1 | 2/2010 | Lu | |
| 2011/0126047 A1 | 5/2011 | Anderson et al. | |
| 2012/0117563 A1 | 5/2012 | Chang et al. | |
| 2012/0327953 A1 | 12/2012 | Vokkarane et al. | |
| 2013/0262390 A1 | 10/2013 | Kumarasamy et al. | |
| 2014/0019621 A1 | 1/2014 | Khan et al. | |
| 2014/0181984 A1 | 6/2014 | Kundu et al. | |
| 2014/0258533 A1 | 9/2014 | Antony | |
| 2015/0363219 A1 | 12/2015 | Kasturi et al. | |
| 2017/0235817 A1 | 8/2017 | Deodhar et al. | |
| 2018/0191601 A1 | 7/2018 | Micallef | |
| 2019/0042325 A1 | 2/2019 | Nair | |
| 2019/0327144 A1 | 10/2019 | Tembey et al. | |
| 2019/0339320 A1* | 11/2019 | Dzafic | G01R 31/085 |
| 2020/0218684 A1 | 7/2020 | Sen et al. | |
| 2020/0412657 A1* | 12/2020 | Jang | H04L 43/0864 |
| 2022/0158756 A1 | 5/2022 | Wang et al. | |

FOREIGN PATENT DOCUMENTS

| | | | |
|---|---|---|---|
| JP | 2003-535526 A | 11/2003 | |
| JP | 2005-064970 A | 3/2005 | |
| JP | 2006-527541 A | 11/2006 | |
| JP | 2010-521761 A | 6/2010 | |
| JP | 2012-505561 A | 3/2012 | |
| JP | 2015-065527 A | 4/2015 | |
| JP | 2015-527649 A | 9/2015 | |
| KR | 10-2014-0003200 A | 1/2014 | |
| WO | WO-01/93607 A1 | 12/2001 | |
| WO | WO-2004/111775 A2 | 12/2004 | |
| WO | WO-2010/041582 A1 | 4/2010 | |
| WO | WO-2015029416 A1 | 3/2015 | |
| WO | WO-2020143380 A1 | 7/2020 | |

OTHER PUBLICATIONS

Yang Chen et al., "Optical Burst Switching: A New Area in Optical Networking Research", IEEE Network, vol. 18, issue 3, pp. 16-23, 2004.

Aten International Co., Ltd. KE6920 datasheet, ver. 01, Jun. 17, 2020, 1-5, https://assets.aten.com/product/spec_sheet/JP/ke6920-6922_ver01j.pdf, Aten Product Information KE6920.

Takamichi Nishijima et al., "On the Impact of Network Environment on Remote Desktop Protocols", IEICE Technical Report CQ2012-21 (Jul. 2012), 2012, pp. 23-28.

Bijoy Chand Chatterjee et al., "Routing and Wavelength Assignment for WDM-based Optical Networks", Springer, pp. 35-43, vol. 410, 2017.

Wei Lu et al., "Dynamic Service Provisioning of Advance Reservation Requests in Elastic Optical Networks", Journal of Lightwave Technology, vol. 31, Issue. 10, 2013, pp. 1621-1627.

M. Jinno et al., "An Overview of Elastic Optical Networks", Proceedings of the 2013 IEICE Communications Society Conference, 2013, p. SS-98-SS-99.

Pegah Afsharlar et al., "Routing and Spectrum Assignment with Delayed Allocation in Elastic Optical Networks", Journal of Optical Communications and Networking, 2017, pp. 1-10.

K. Yamaguchi et al., "M×N Wavelength Selective Switches Using Beam Splitting By Space Light Modulators", IEEE Photonics Journal, vol. 8, No. 1, Feb. 2016.

R. A. Wagner and S. E. Dreyfus, "The Steiner Problem in Graphs", Networks 1, Dreyfus and Wagner, pp. 195-207, 1972.

Y. Liu et al., "The Degree-Constrained Multicasting Algorithm Using Ant Algorithm", Proceedings of the 10th International Conference on Telecommunications, 2003, pp. 370-374.

Ryan Shea and Jiangchuan Liu, "Cloud Gaming: Architecture and Performance", IEEE Network, Jul./Aug. 2013, IEEE 2013, pp. 16-21.

International Search Report of the ISA issued in PCT/JP2020/036303, mailed Feb. 2, 2021; ISA/JP.

International Search Report of the ISA issued in PCT/JP2020/039655, mailed Feb. 16, 2021; ISA/JP.

Masahiko Jinno, "Virtualization in Optical Networks from Network Level to Hardware Level [Invited]", Oct. 2013, Optical Society of America (Year: 2013).

* cited by examiner

INFORMATION PROCESSING SYSTEM, INFORMATION PROCESSING METHOD AND PROGRAM

CROSS-REFERENCE TO RELATED APPLICATIONS

This application is a 371 U.S. National Phase of International Application No. PCT/JP2020/034759, filed on Sep. 14, 2020. The entire disclosure of the above application is incorporated herein by reference.

TECHNICAL FIELD

The present invention relates to technology for an information processing system, an information processing method, and a program.

BACKGROUND ART

A computer, a game machine (hereinafter referred to as a "computer"), or the like is connected to a user interface (UI) device such as a display, a keyboard, a mouse, and an operation controller and operated. As illustrated in FIG. 17, in many computers 901, a UI device 902 at hand of a user is connected to a computer 901 also installed at hand (user base 900) in a wired or wireless manner. Furthermore, the computer 901 may be connected to a sensor 903 that detects movement of a hand, a face, a body, or the like of the user US in a wired or wireless manner. FIG. 17 is a diagram illustrating a configuration example in which a computer and a UI device in the related art are directly connected.

A device called keyboard, video, mouse (KVM) extender (hereinafter referred to as extender) is used as a device that enables a UI device to be installed at a location physically distant from a computer. In a configuration example of FIG. 18, a UI device 902 at hand is connected to an extender 904, and is connected to a computer 911 in which a facing extender 912 is installed via a transmission path 915. Note that the computer 911 and the extender 912 are installed, for example, in a computer base 910. FIG. 18 is a diagram illustrating an example of connection between a UI device and a computer using extenders in the related art. Furthermore, in a configuration example using extenders, in a case where there is a plurality of computer bases 910-1 to 910-3 as illustrated in FIG. 19, a switch 921 switches connection between the extender 904 of a user base 900 and the computer bases 910-1 to 910-3. FIG. 19 is a diagram illustrating another example of connection between a UI device and computers using extenders in the related art.

Furthermore, another related art that enables a UI device and computers to be installed at physically distant locations includes a remote desktop function (for example, see Non Patent Literature 1). FIG. 20 is a diagram illustrating a configuration example of remote desktops in the related art. UI devices (902-1 to 902-3) at hand (user bases 900-1 to 900-3) of users (US1 to US3) are connected to computers (901-1 to 901-3) at hand, and the computers are connected to computers (911-1 to 911-3) at a remote location (for example, computer base 910A) via networks (915-1 to 915-3) such as the Internet. In a remote desktop, a program executed on a remote computer can be operated using a UI device at hand, and connection destination computers can also be changed.

CITATION LIST

Non Patent Literature

Non Patent Literature 1: "Influence of network environment on performance of remote desktop protocol", IEICE Technical Report CQ2012-21 (2012-7), Institute of Electronics, Information and Communication Engineers (IEICE), 2012, p. 23-28, by Takamichi Nishijima, Yuto Nakai, Hiroyuki Ohsaki, etc.

SUMMARY OF INVENTION

Technical Problem

In the related art, a UI device and a computer are installed at physically distant locations, and in a case where delay of a communication path connecting the UI device and the computer is large or in a case where fluctuation of the delay is large, operational feeling is greatly deteriorated. For example, in a case where the delay between the UI device and the computer is extremely large, a character input by a keyboard and movement of a pointer by a mouse are delayed from timing intended by a user by the delay time, so that the operational feeling is deteriorated. Furthermore, in a case where the delay between the UI device and the computer fluctuates, the operational feeling is unstable.

In view of the above circumstances, an object of the present invention is to provide technology capable of improving operational feeling in a case where a user interface device and a computer are installed at distant locations.

Solution to Problem

One aspect of the present invention is an information processing system including a computer installed in a computer base, a first transceiver connected to the computer, a second transceiver installed in a user base used by a user, a device connected to the second transceiver, a second network configured to perform communication between a plurality of the first transceivers and the second transceiver, and a controller configured to control connection between one of the plurality of the first transceivers and the second transceiver, in which the controller is configured to control connection between one of the plurality of the first transceivers and the second transceiver via the network having a circuit switching function.

One aspect of the present invention is an information processing method in an information processing system including a computer installed in a computer base, a first transceiver connected to the computer, a second transceiver installed in a user base used by a user, a device connected to the second transceiver, a network configured to perform communication between a plurality of the first transceivers and the second transceiver, and a controller configured to control connection between one of the plurality of the first transceivers and the second transceiver, in which the method includes controlling, by the controller, connection between one of the plurality of the first transceivers and the second transceiver via the network having a circuit switching function.

One aspect of the present invention is a program that is executed in an information processing system including a computer installed in a computer base, a first transceiver connected to the computer, a second transceiver installed in a user base used by a user, a device connected to the second transceiver, a network configured to perform communication between a plurality of the first transceivers and the second transceiver, and a controller configured to control connection between one of the plurality of the first transceivers and the second transceiver, the program causing a computer of the controller to control connection between one of the plurality of the first transceivers and the second transceiver.

Advantageous Effects of Invention

According to the present invention, operational feeling can be improved in a case where a user interface device and a computer are installed at distant locations.

BRIEF DESCRIPTION OF DRAWINGS

FIG. 11 is a diagram illustrating a configuration example in which a computer and a UI device in the related art are directly connected.

DESCRIPTION OF EMBODIMENTS

Hereinafter, embodiments of the present invention will be described with reference to the drawings.

First Embodiment

Figure 1:
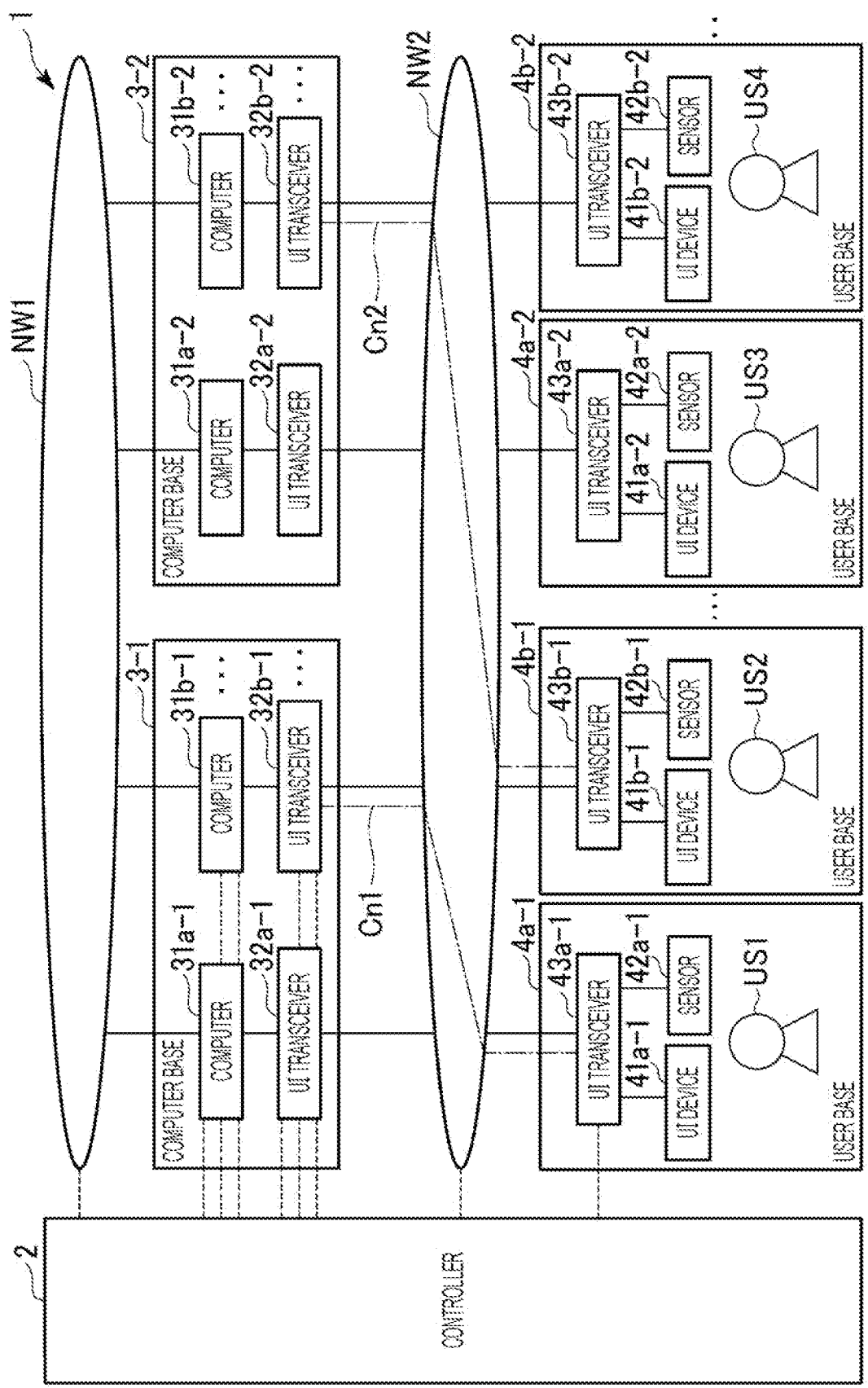
FIG. 1 is a diagram illustrating an example of an overall configuration of an information processing system according to a first embodiment.

FIG. 1 is a diagram illustrating an example of an overall configuration of an information processing system according to the present embodiment. As illustrated in FIG. 1, the information processing system 1 includes a controller 2, computer bases 3 (3-1, 3-2, . . . , 3-$n$ ($n$ is an integer of 1 or more)), user bases 4 (4*a*-1, 4*b*-1, 4*a*-2, 4*b*-2, . . . , 4*a*-$m$ [$m$ is an integer of 1 or more], 4*b*-$m$), a first network NW1, and a second network NW2 (network).

One or a plurality of computers 31 and UI transceivers 32 are installed in the computer bases 3. In the example of FIG. 1, the computers 31 (31*a*-$n$, 31*b*-$n$, . . . ) and the UI transceivers 32 (32*a*-$n$, 32*b*-$n$, . . . ) (first transceivers) are installed in the computer bases 3. Note that the computers 31 and the UI transceivers 32 may be integrated. In FIG. 1, a part of a configuration installed in the computer bases 3 is omitted. Note that the configuration installed in the computer bases 3 will be described with reference to FIG. 2 and the like.

The user bases 4 include UI devices 41 (41*a*-$m$, 41*b*-$m$, . . . ), sensors 42 (42*a*-$m$, 42*b*-$m$, . . . ), and UI transceivers 43 (43*a*-$m$, 43*b*-$m$, . . . ) (second transceivers).

The information processing system 1 includes one or a plurality of the computer bases 3.

The controller 2 controls connection relation between the UI transceivers 43 of the user bases 4 and the UI transceivers 32 of the computer bases 3. The controller 2 is connected to the computers 31 and the UI transceivers 32 of the computer bases 3, a communicator included in the second network NW2 (not illustrated), and the UI transceivers 43 of the user bases 4, and can confirm setting information of each device and change the setting. In addition, the controller 2 performs delay adjustment control. The controller 2 is connected to the computer bases 3, the user bases 4, the first network NW1, and the second network NW2 in a wired or wireless manner.

Note that the controller 2 is formed using a processor such as a central processing unit (CPU) and a memory. Note that all or some of each function of the controller 2 may be implemented using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a read-only memory (ROM), a compact disk read-only disk (CD-ROM), or a semiconductor storage device (for example, a solid state drive [SSD]), or a storage device such as a hard disk or a semiconductor storage device built in a computer system. The program may be transmitted via an electric communication line.

The first network NW1 includes, for example, the Internet and includes a communication network. In addition, the first network NW1 may have an authentication function.

The second network NW2 may be a wired network or a wireless network, may have physical or logical topology, and may be a circuit switched network or a packet switched network.

Next, the computer bases 3 will be described.

The computer bases 3 are, for example, data centers, communication buildings, server rooms, or the like.

The computers 31 may be physical computers or logical computers (virtual computers). In a case of virtual computers, for example, CPUs, graphics processing units (GPUs), memories, storages, and the like are virtualized. Furthermore, the computers 31 may be game machines. The computers 31 are connected to other computers or servers of data centers (not illustrated) via the first network NW1. The computers 31 are connected to the UI transceivers 32, and user interface information such as display signals and operation information of the computers 31 is exchanged. Specific examples of a display signal include a high-definition multimedia interface (HDMI) (registered trademark) and a DisplayPort, and examples of a signal of the operation information include a universal serial bus (USB). Furthermore, examples of a signal obtained by combining a display signal and operation information include a USB4 and a Thunderbolt (registered trademark) 3. Note that one user may boost and use a plurality of physical GPUs in cooperation.

The UI transceivers 32 receive display signals and operation information, and convert the display signals and the operation information into signal formats that enable long-distance communication via the second network NW2. Furthermore, the UI transceivers 32 are connected to the UI transceivers 43 of the user bases 4 via the second network NW2. The signal formats that enable long-distance communication are, for example, Ethernets (registered trademark) or optical transport networks (OTNs). Note that a configuration example of the UI transceivers 32 will be described below.

Next, the user bases 4 will be described.

The user bases 4 are bases where users US (US1, . . . ) perform work, games, and the like, and are, for example, home, companies, business rental spaces, game arcades, or the like.

The UI devices 41 are devices related to user interfaces, and are, for example, displays, keyboards, mice, operation controllers (actuators), cameras, virtual reality (VR) headsets, augmented reality (AR) headsets, microphones, speakers, or the like. Alternatively, the UI devices 41 may be any devices that input and output the five human senses (touch, eyesight, hearing, smell, and taste) to and from the computers 31, in addition to the above devices. The UI devices 41 and the UI transceivers 43 are connected, for example, in signal formats such as HDMIs, DisplayPorts, or USBs.

The sensors 42 are, for example, sensors that detect movement of hands, faces, bodies, or the like of the users US, position sensors, altitude sensors, speed sensors, acceleration sensors, temperature sensors, humidity sensors, pressure sensors, vibration sensors, optical sensors, sound sensors, electric field sensors, magnetic field sensors, or the like. The sensors 42 and the UI transceivers 43 are connected, for example, by signal formats such as USBs.

The UI transceivers 43 are connected to the UI transceivers 32 of the computer bases 3 via the second network NW2. Note that the second network NW2 has a switching function, and can flexibly change connection relation between the UL transceivers 32 of the computer bases 3 and the UI transceivers 43 of the user bases 4. Note that a plurality of UI signals may be multiplexed in output of the UI transceivers 43. Note that the UI transceivers 43 are only required to be connected to at least one of the UI devices 41 or the sensors 32.

Next, an example of connection between the user bases 4 and the computer bases 3 will be described.

In the example of FIG. 1, two users US1 and US2 use computers 31 via the second network NW2.

In a first path Cn1, a UI transceiver 43*a*-1 of a user base 4*a*-1 and a UI transceiver 32*b*-1 of a computer base 3-1 are connected via the second network NW2. In a second path Cn2, a UI transceiver 43*b*-1 of a user base 4*b*-1 and a UI transceiver 32*b*-2 of a computer base 3-2 are connected via the second network NW2. Note that connection relation between the UI transceivers (32, 43) is controlled by the controller 2.

Next, a configuration example of the computer bases and the second network will be described.

Figure 2:
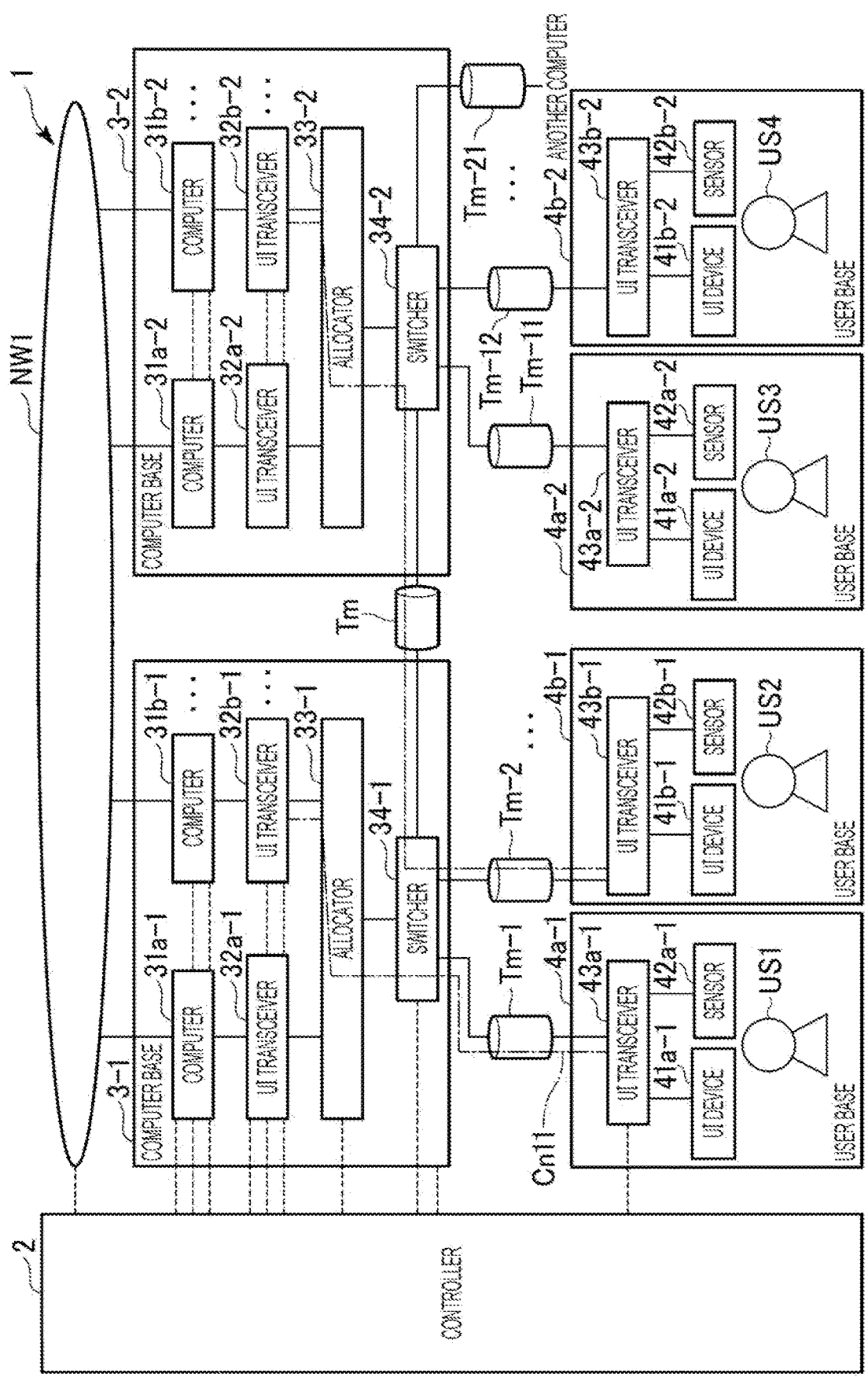
FIG. 2 is a diagram illustrating a configuration example of computer bases and an example of a second network according to the first embodiment.

FIG. 2 is a diagram illustrating a configuration example of the computer bases and an example of the second network according to the present embodiment. In the example of FIG. 2, for example, at least one of the computers 31 (31*a*-1, 31*b*-2, 31*a*-2, 31*b*-2), at least one of the UI transceivers 32 (32*a*-1, 32*b*-2, 32*a*-2, 32*b*-2), allocators 33 (33-1, 33-2), and switchers 34 (34-1, 34-2) are installed in the computer bases 3 (3-1, 3-2).

The UI transceivers 43 of the user bases 4 are connected to the switchers 34 of the computer bases 3 via transmission paths Tm. The transmission paths Tm may be, for example, colored interfaces (IFs) based on wavelength division multiplexing (WDM) signals or grey IFs based on non-WDM signals. The switchers 34 are also connected to a switcher 34 of another computer base 3 via a transmission path Tm, and can flexibly change connection relation between the UI transceivers (32, 43). The switchers 34 are connected to an allocator 33 of the same computer base 3, and can set which computer 31 of the said computer base 3 is connected.

The switchers 34 (switches) switch the transmission paths Tm under the control of the controller 2. The switchers 34 are, for example, optical switches, electric switches, or robot panel switches.

The allocators 33 (switches) switch the UI transceivers 32 connected to the UI transceivers 43 of the user bases 4 under the control of the controller 2. The allocators 33 are, for example, optical switches, electric switches, or robot panel switches.

In the example of FIG. 2, in a case where a first user US1 uses the user base 4*a*-1, the UI transceiver 43*a*-1 of the user base 4*a*-1 is connected to the UI transceiver 32*b*-1 of the computer base 3-1 via a transmission path Tm-1, and a switcher 34-1 and an allocator 33-1 of the computer base 3-1 as in a path Cn11 on the basis of the control of the controller 2.

Furthermore, in a case where a second user US2 uses the user base 4*b*-1, the UI transceiver 43*b*-1 of the user base 4*b*-1 is connected to the UI transceiver 32*b*-1 of the computer base 3-2 via a transmission path Tm-2, the switcher 34-1 of the computer base 3-1 and the transmission path Tm, and a switcher 34-2 and an allocator 33-2 of the computer base 3-2 as in a path Cn12 on the basis of the control of the controller 2.

In this case, the second network NW2 is a network having a circuit switching function (hereinafter referred to as a "circuit switched network"). The circuit switched network is, for example, an optical transport network (OTN) or synchronous digital hierarchy (SDH). Note that the circuit switched network includes transmission paths Tm, Tm-1, Tm-2, Tm-11, Tm-12, Tm-21, and the like.

For example, in a remote desktop function of the related art, since UI information is exchanged by a network using an Ethernet switch or a router, switching of media access control address (MAC) frames and switching of Internet protocol (IP) packets are performed throughout the network.

At the time of these switching operations, a signal is temporarily stored in a switching queue, and then the signal is switched at a timing when switching is possible, and thus, the delay time fluctuates.

On the other hand, in the circuit switched network according to the present embodiment, since the communication capacity can be occupied by one user and the delay time is constant, the communication between the UI transceivers 32 and the UI transceivers 43 is stabilized. One user can occupy the communication capacity by time slots of the communication being allocated by time division multiplexing. Furthermore, the delay time is constant because the allocated time slots are regularly switched without delay even at the time of switching.

Note that the circuit switched network also includes a packet switched network that emulates circuit switching. In the packet switched network that emulates circuit switching, a bandwidth is secured by priority being given to packets, and delay time of switching is stabilized by switching being preferentially performed according to the priority of the packets at the time of switching.

Next, a configuration example of a UI transceiver will be described.

Figure 3:
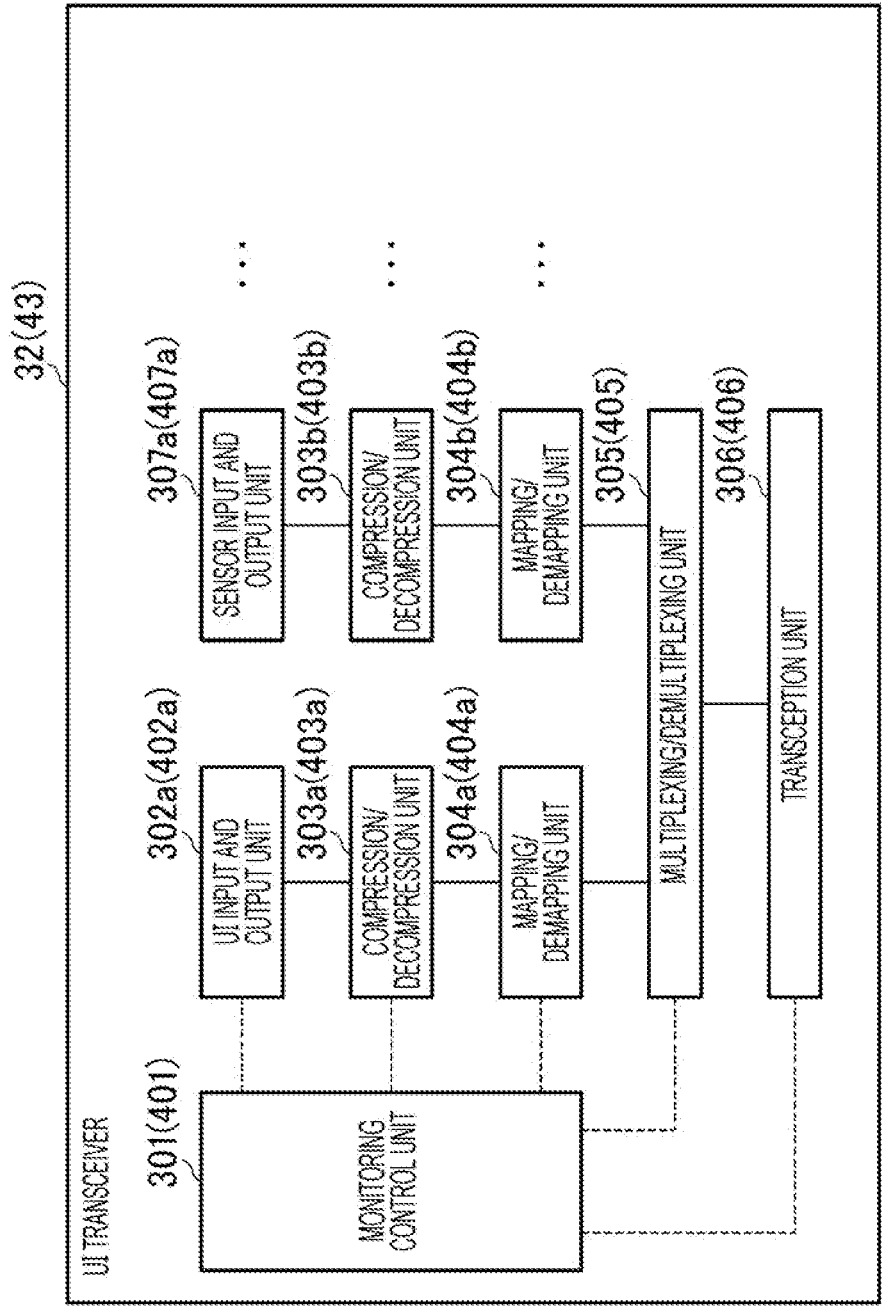
FIG. 3 is a diagram illustrating an example of a configuration of a UT transceiver according to the first embodiment.

FIG. 3 is a diagram illustrating an example of a configuration of a UI transceiver according to the present embodiment. In the following description, a case where a UI transceiver 32 and a UI transceiver 43 have the same configuration will be described, but the configurations may be different.

As illustrated in FIG. 3, the UI transceiver 32 includes, for example, a monitoring control unit 301, at least one UI input and output unit 302 (302*a*, . . . ), at least one of a sensor input and output unit 307 (307*a*, . . . ) or compression/decompression units 303 (303*a*, 303*b*, . . . ), at least one of mapping/demapping units 304 (304*a*, 304*b*, . . . ), a multiplexing/demultiplexing unit 305, and a transception unit 306.

Furthermore, the UI transceiver 43 includes, for example, a monitoring control unit 401, at least one UI input and output unit 402 (402*a*, . . . ), at least one of a sensor input and output unit 407 (407*a*, . . . ) or compression/decompression units 403 (403*a*, 403*h*, . . . ), at least one of mapping/demapping units 404 (404*a*, 404*b*, . . . ), a multiplexing/demultiplexing unit 405, and a transception unit 406. Note that the configuration illustrated in FIG. 3 is an example, and the present invention is not limited thereto.

In a case of the UI transceiver 32, the monitoring control unit 301 is connected to the controller 2 by a wired or wireless line, the transception unit 306 is connected to an allocator 33, and the UI input and output unit 302 and the sensor input and output unit 307 are connected to a computer 31.

In a case of the UI transceiver 43, the monitoring control unit 401 is connected to the controller 2 by a wired or wireless line, the transception unit 406 is connected to a transmission path Tm, a UI input and output unit 402*a* is connected to a UI device 41, and a sensor input and output unit 407*a* is connected to a sensor 42. Note that the arrangement of the transception unit 406 and the multiplexing/demultiplexing unit 405 may be reversed.

The monitoring control unit 301 is connected to each unit of the UI transceiver 32, and monitors the state of each unit and changes the setting. The monitoring control unit 301 is connected to the controller 2, and changes connection relation of the UI transceiver 32, monitors the state of the UI device 41, and performs the operation setting.

The monitoring control unit 401 is connected to each unit of the UI transceiver 43, and monitors the state of each unit and changes the setting. The monitoring control unit 401 is connected to the controller 2, and changes connection relation of the UI transceiver 43, monitors the state of the UI device 41, and performs the operation setting.

The UI input and output unit 302 is connected to a UI signal from a computer 31 in a case of a computer base 3. The UI signal is, for example, each signal of an HDMI, a DisplayPort, a USB, a Thunderbolt, a Bluetooth (registered trademark), an analog audio, and a digital audio. The UI input and output unit 302 is connected to a compression/decompression unit 303*a*.

The UI input and output unit 402 is connected to the UI device 41. The UI input and output unit 402 is connected to a compression/decompression unit 403*a*.

The sensor input and output unit 307 is connected to a UI signal from the computer 31. The sensor input and output unit 307 is connected to a compression/decompression unit 303*b*.

The sensor input and output unit 407 is connected to the sensor 42. The sensor input and output unit 407 is connected to a compression/decompression unit 403*b*.

The compression/decompression units 303 compress or decompress the capacity of compressible UI signals under the control of the monitoring control unit 401. Specific examples include compression of HDMI and DisplayPort signals of display signals, and examples of the compression method include display stream compression (DSC), video electronics standards association (VESA) display compression for mobile (VDC-M), and moving picture experts group (MPEG) defined by VESA. Note that the compression/decompression units 303 may be omitted. Furthermore, the compression/decompression units 303 may change the compression method or the decompression method according to the state of the transmission path Tm. For example, the higher the compression rate, the higher the latency of the compression/decompression units 303. Therefore, the compression/decompression units 303 use, for example, no compression or a compression method using a low compression rate in order to implement low latency. The compression/decompression units 303 are connected to the mapping/demapping units 304.

The compression/decompression units 403 perform reverse processing to that of the compression/decompression units 303 under the control of the monitoring control unit 401. The compression/decompression units 403 are connected to the mapping/demapping units 404.

The mapping/demapping units 304 convert UI signals into signal forms that enable long-distance transmission under the control of the monitoring control unit 301. The signal forms are, for example, OTNs defined by ITU telecommunication standardization sector (ITU-T). The mapping/demapping units 304 are connected to the multiplexing/demultiplexing unit 305.

The mapping/demapping units 404 convert UI signals into signal forms that enable long-distance transmission under the control of the monitoring control unit 401. The mapping/demapping units 404 are connected to the multiplexing/demultiplexing unit 405.

The multiplexing/demultiplexing unit 305 multiplexes and demultiplexes a plurality of signals under the control of the monitoring control unit 301. For example, in a case where OTNs are used as signal forms that enable long-distance transmission, the multiplexing/demultiplexing unit 305 multiplexes a plurality of optical data unit (ODU) signals output from the mapping/demapping units 304 into an ODU having larger capacity. The multiplexing/demultiplexing unit 305 is connected to the transception unit 306.

The multiplexing/demultiplexing unit 305 performs reverse processing to that of the multiplexing/demultiplexing unit 305 under the control of the monitoring control unit 401. The multiplexing/demultiplexing unit 405 is connected to the transception unit 406.

The transception unit 306 transmits and receives a signal transmitted through the second network NW2 under the control of the monitoring control unit 301. For example, in a case of an OTN, the transception unit 306 transmits and receives an optical transport unit (OTU) signal. The transception unit 306 is connected to the second network NW2 to be connected to a UI transceiver 43 of a user base 4 via the allocator 33, a switcher 34, and the transmission path Tm. The information capacity that is transmitted and received is, for example, an OTU0LL, an OTU1, an OTU2, an OTU2e, an OTU3, an OTU4, an OTUCn, a gigabit Ethernet (GbE), 2.5 GbEs, 5 GbEs, 10 GbEs, 25 GbEs, 50 GbEs, 100 GbEs, 400 GbEs, or the like. Note that the transception unit 306 may change the capacity according to the state of the transmission path Tm.

The transception unit 406 transmits and receives information to and from a computer base 3 via the transmission path Tm under the control of the monitoring control unit 401.

Figure 4:
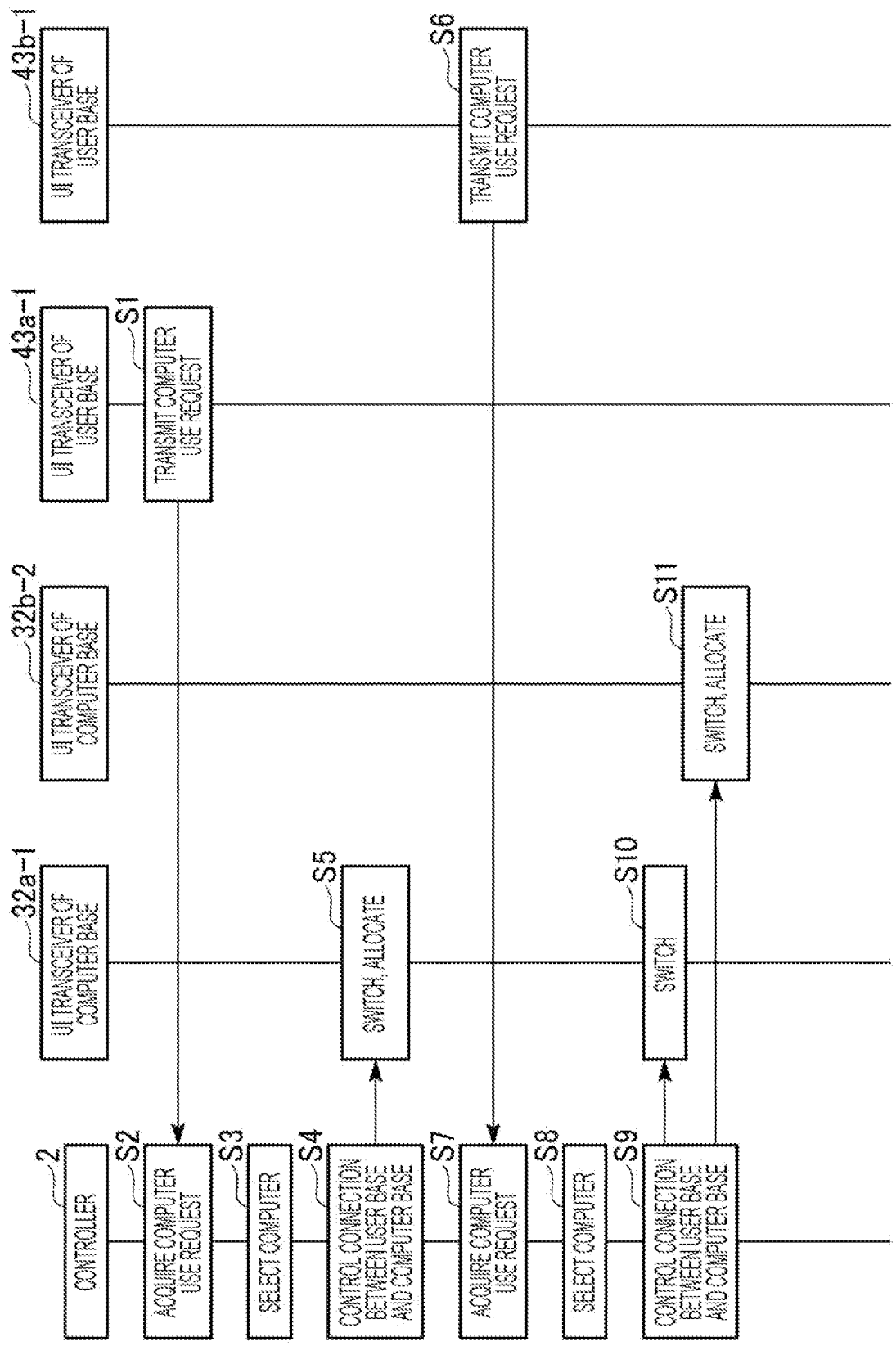
FIG. 4 is a flowchart of a processing procedure example of a computer system according to the first embodiment.

Next, a processing procedure example of the information processing system 1 will be described with reference to FIGS. 2 and 4. FIG. 4 is a sequence diagram of the processing procedure example of a computer system according to the present embodiment.

The first user US1 of the user base 4a-1 selects or inputs a use request of a computer 31, for example, by operating the UI device. The UI transceiver 43a-1 of the user base 4a-1 transmits the computer use request to the controller 2 (step S1). The controller 2 acquires the computer use request transmitted by the UI transceiver 43a-1 (step S2). Note that the computer use request may include performance of a computer desired to be used (including performance of a graphic board) and the like.

On the basis of the computer use request, the controller 2 selects, for example, a computer 31b-1 of the computer base 3-1 closest to the user base 4a-1 in order to shorten the transmission delay time. In a case where a usable computer 31 is not in the said computer base 3, the controller 2 may sequentially search for a plurality of computer bases 3 close to the user base 4 (step S3).

The controller 2 controls the switcher 34-1 and the allocator 33-1 of the computer base 3-1 so as to connect the UI transceiver 43a-1 to the UI transceiver 32b-1 of the computer base 3-1 in connection relation of the path Cn11 (step S4). Under the control of the controller 2, the switcher 34-1 and the allocator 33-1 of the computer base 3-1 switch a transmission path Tm-1 for connection, allocate the UI transceiver 32b-1, and connect the UI transceiver 43a-1 to the UI transceiver 32t-1 (step S5). As a result, the UI transceiver 43a-1 is connected in connection relation of the path Cn11, and the first user US1 can use the computer 31b-1 of the computer base 3-1 from the user base 4a-1.

The second user US2 of the user base 4b-1 selects or inputs a use request of a computer 31, for example, by operating the UI device. The UI transceiver 43b-1 of the user base 4b-1 transmits the computer use request to the controller 2 (step S6). The controller 2 acquires the computer use request transmitted by the UI transceiver 43b-1 (step S7).

The controller 2 selects an unused computer 31 on the basis of the computer use request. For example, in a case where the computers 31 of the computer base 3-1 that is closest to the user base 4b-1 are in use, the controller 2 selects, for example, a computer 31b-2 of the computer base 3-2 that is close to the computer base 3-1 (step 38).

The controller 2 controls the switcher 34-1 of the computer base 3-1 and the switcher 34-2 and the allocator 33-2 of the computer base 3-2 so as to connect the UI transceiver 43b-1 to the UI transceiver 32b-2 of the computer base 3-2 in connection relation of the path Cn12 (step S9).

The switcher 34-1 of the computer base 3-1 performs switching so as to connect the transmission paths Tm-2 and Tm for connection under the control of the controller 2 (step S10).

Under the control of the controller 2, the switcher 34-2 and the allocator 33-2 of the computer base 3-2 perform switching so as to connect the transmission paths Tm-2 and Tm, allocate the UI transceiver 32b-2, and connect the UI transceiver 43b-1 to the UI transceiver 32b-2 (step S10). As a result, the UI transceiver 43b-1 is connected in connection relation of the path Cn12, and the second user US2 can use the computer 31b-2 of the computer base 3-2 from the user base 4b-1.

As described above, in the present embodiment, the UI devices 41 and the sensors 42 of the user bases 4 are connected to the computers 31 of the computer bases 3 via the second network NW2. Note that, in the present embodiment, the delay time between the UI devices 41 or the sensors 42 and the computers 31 can be adjusted, and delay suitable for a delay-sensitive application can be set. Note that the delay time is adjusted by the controller 2. As a result, according to the present embodiment, for example, fairness is achieved in gaming and eSports, and sensors can acquire sensing information at a plurality of points at the same time.

Furthermore, according to the present embodiment, the UI devices and the computers can be installed at physically distant locations, the connection relation can be flexibly changed, and also operational feeling that is comparable to that in a case where the UI devices and the computers are locally provided can be achieved.

Second Embodiment

In the present embodiment, connection relation between UI transceivers 32 and UI transceivers 43 is determined in consideration of the response time of a UI device 41 that affects user's operational feeling among UI devices 41 used by users.

Figure 5:
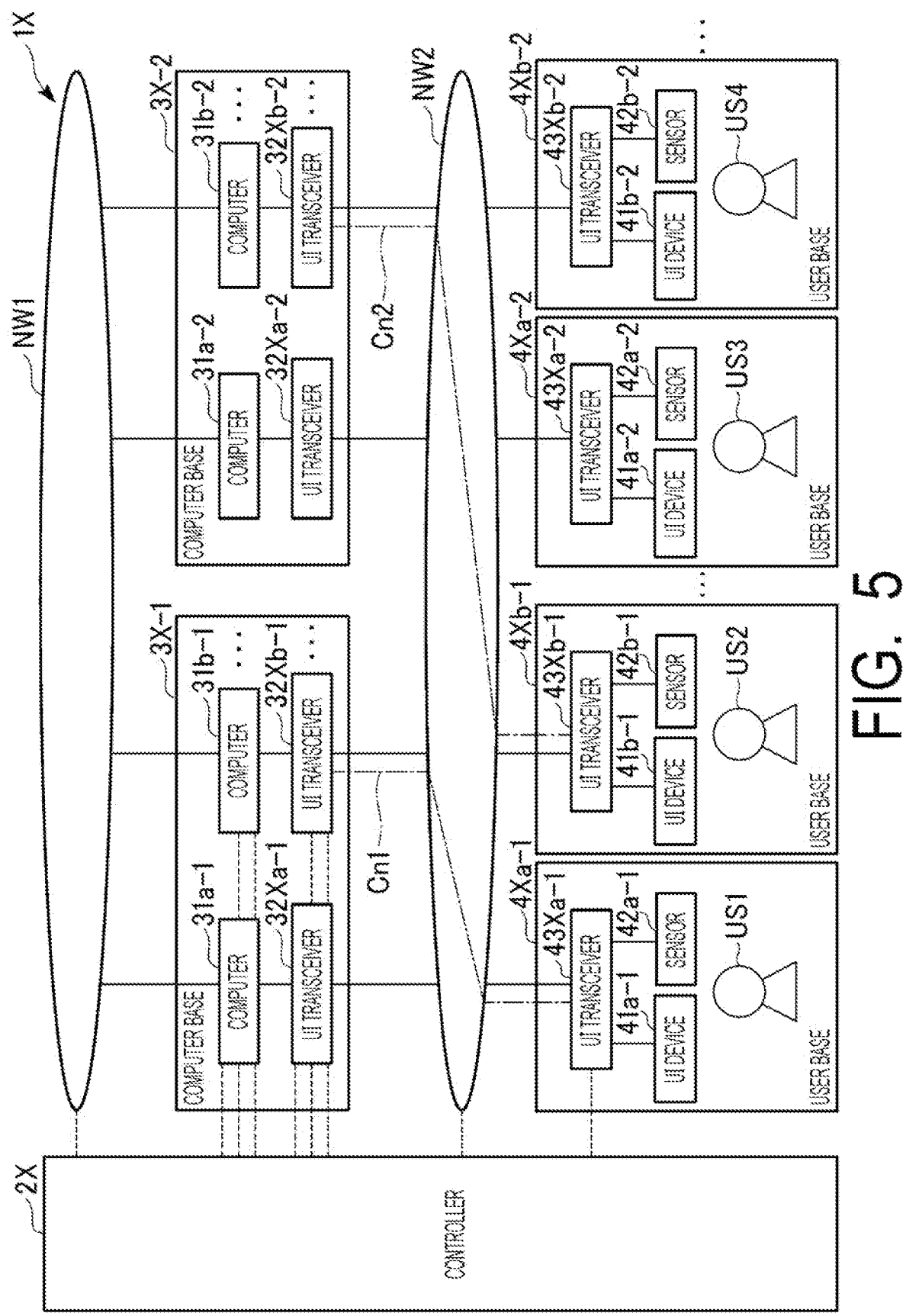
FIG. 5 is a diagram illustrating an example of an overall configuration of an information processing system according to a second embodiment.

FIG. 5 is a diagram illustrating an example of an overall configuration of an information processing system according to the present embodiment. As illustrated in FIG. 5, an information processing system 1X includes a controller 2, computer bases 3X (3X-1, 3X-2, . . . , 3X-n), user bases 4X (4X-1, 4X-2, 4X-3, 4X-4, . . . , 4X-m), a first network NW1, and a second network NW2.

In the computer bases 3X, computers 31 (31a-n, 31b-n, . . . ) and UI transceivers 32X (32Xa-n, 32Xb-n, . . . ) (first transceivers) are installed. Note that a part of a configuration of the computer bases 3X is omitted.

In the user bases 4X, UT devices 41 (41a-m, 41b-m, . . . ), sensors 42 (42a-m, 42b-m, . . . ), and UI transceivers 43X (43Xa-m, 43Xb-m, . . . ) (second transceivers) are installed.

The information processing system 1X includes one or a plurality of the computer bases 3X.

In addition to the processing of the controller 2, the controller 2X controls connection relation between the UI transceivers 43X of the user bases 4X and the UI transceivers 32X of the computer bases 3X on the basis of the delay time between the UI transceivers 32X and the UI transceivers 43X.

Here, the delay time related to operational feeling will be described.

For example, in a case where display devices connected to the UI transceivers 43 of the user bases 4 have a refresh rate of 40 (Hz), the update cycle of the display devices is 16.1 (ms). For example, in a case where a user has a keyboard, a computer, and a display device at hand, and inputs a character from the keyboard of the computer to which the keyboard and the display device are directly connected, the character input by the user is reflected on the screen at the next cycle.

On the other hand, in a case where the keyboard and the display are at hand, the computer is remote, and the round-trip delay time is, for example, 100 (me), the lag of the update cycle is 100/16.7=6.0 (frames). In this case, user operation is reflected on the screen with delay of at least six frames being added, and operational feeling is deteriorated.

In the present embodiment, in order to make user's operational feeling comparable to that in a case where a UI device 41 and a computer 31 are at hand, the controller 2X determines connection relation of UI transceivers such that the delay time falls within predetermined delay time. Note that the predetermined delay time may be, for example, delay time desired by a user. The controller 2X selects and connects a UI transceiver 32X of a computer base 3X such that the round-trip time is within predetermined time desired by a user. For example, in a case where a user requires round-trip time of 16.7 (ms) or less for UI communication, the controller 2X selects and connects a UI transceiver 32X of a computer base 3X on the basis of the predetermined round-trip time and the delay time desired by the user.

Alternatively, in a case where the update frequency of the UI devices 41 is f (Hz), the controller 2X may select and connect a UI transceiver 32X of a computer base 3X such that the round-trip time between the UI transceivers is 1/f (sec) or less.

As a method of selecting a UI transceiver, there are a method of displaying a table of delay time between the bases included in the controller 2X on a display device and selecting delay time by operation of a UI device, a method of calculating delay time from the distance of transmission paths connecting the bases, a method of measuring delay time by actually connecting UI transceivers and changing connection relation until a request condition is satisfied, a combination thereof, and the like.

Next, a configuration example of UI transceivers and measurement of delay time will be described.

Figure 6:
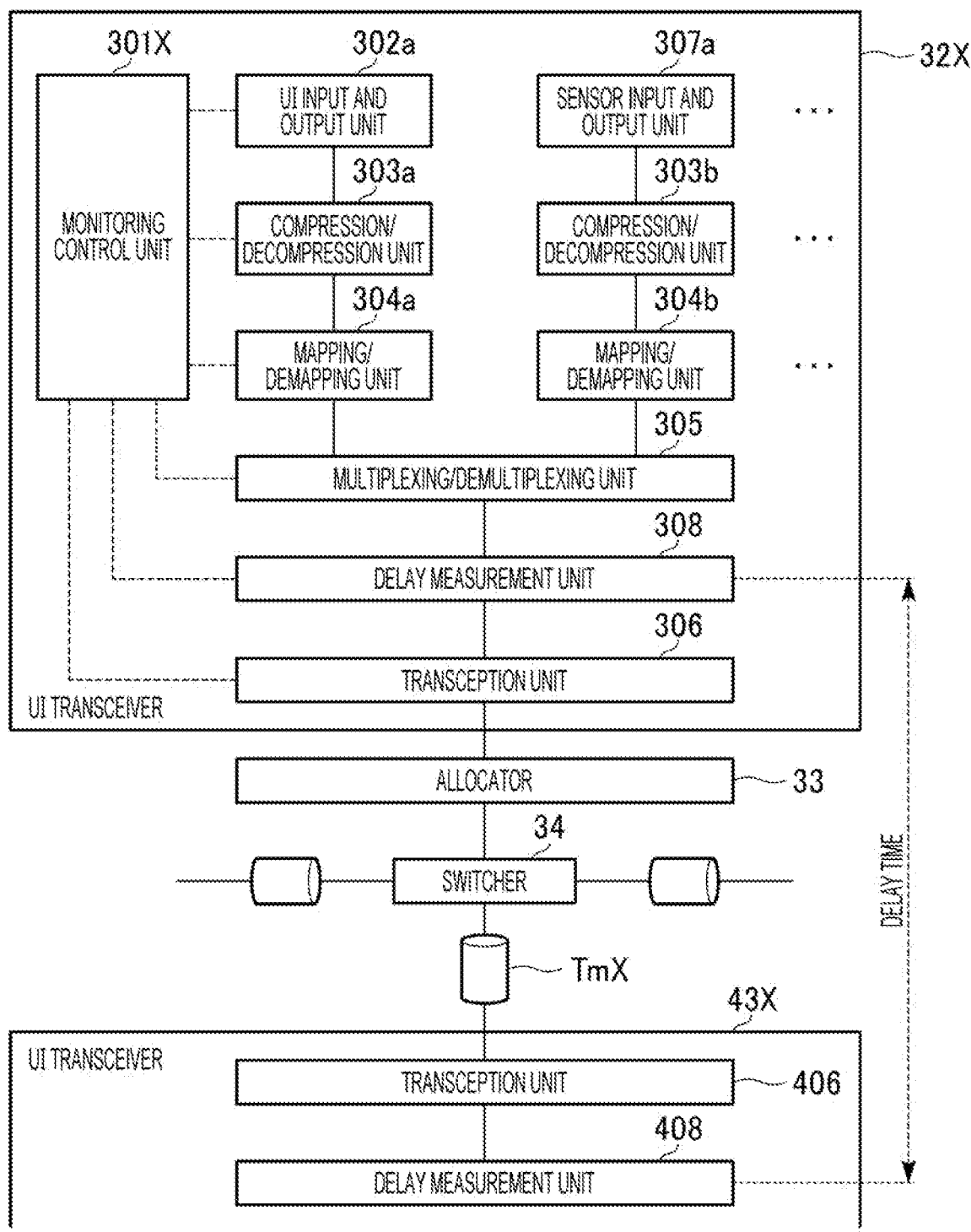
FIG. 6 is a diagram illustrating an example of configurations of UI transceivers according to the second embodiment.

FIG. 6 is a diagram illustrating an example of configurations of UI transceivers according to the present embodiment. In the following description, a case where a UI transceiver 32X and a UI transceiver 43X have the same configuration will be described, but the configurations may be different. As illustrated in FIG. 6, the UI transceiver 32X of a computer base 3X includes, for example, a monitoring control unit 301X, at least one UI input and output unit 302 (302a, . . . ) or sensor input and output unit 307 (307a, . . . ), at least one of compression/decompression units 303 (303a, 303b, . . . ), at least one of mapping/demapping units 304 (304a, 304b, . . . ), a multiplexing/demultiplexing unit 305, a transception unit 306, and a delay measurement unit 308. Note that the delay measurement unit 308 may be arranged between the mapping/demapping units 304 and the multiplexing/demultiplexing unit 305. Note that the configuration illustrated in FIG. 6 is an example, and the present invention is not limited thereto.

Furthermore, the UI transceiver 43X of a user base 4X includes, for example, a monitoring control unit 401X, at least one UI input and output unit 402 (402a, . . . ) or sensor input and output unit 407 (407a, . . . ), at least one of compression/decompression units 403 (403a, 403b, . . . ), at least one of mapping/demapping units 404 (404a, 304b, . . . ), a multiplexing/demultiplexing unit 405, a transception unit 404, and a delay measurement unit 408. Note that the delay measurement unit 408 may be arranged between the mapping/demapping units 404 and the multiplexing/demultiplexing unit 405. Note that, in FIG. 6, a part of the configuration of the UI transceiver 43X is omitted.

As illustrated in FIG. 6, the UI transceiver 32X (43X) of the present embodiment further includes the delay measurement unit 308 (408) in addition to the UI transceiver 32 (43) of the first embodiment.

The delay measurement unit 308 (408) measures delay to the delay measurement unit of the facing UI transceiver. The delay measurement method is, for example, ODU delay measurement (ODU DM) defined by an OTN.

The monitoring control unit 301X (401X) acquires the delay time measured by the delay measurement unit 308 (408). At least either one of the monitoring control unit 301X or the monitoring control unit 401X outputs delay time information indicating the acquired delay time to the controller 2X.

The controller 2X determines connection relation between the UI transceiver 32 and the UL transceiver 43 on the basis of the delay time acquired from a plurality of UI transceivers 33X (or 44X).

Figure 7:
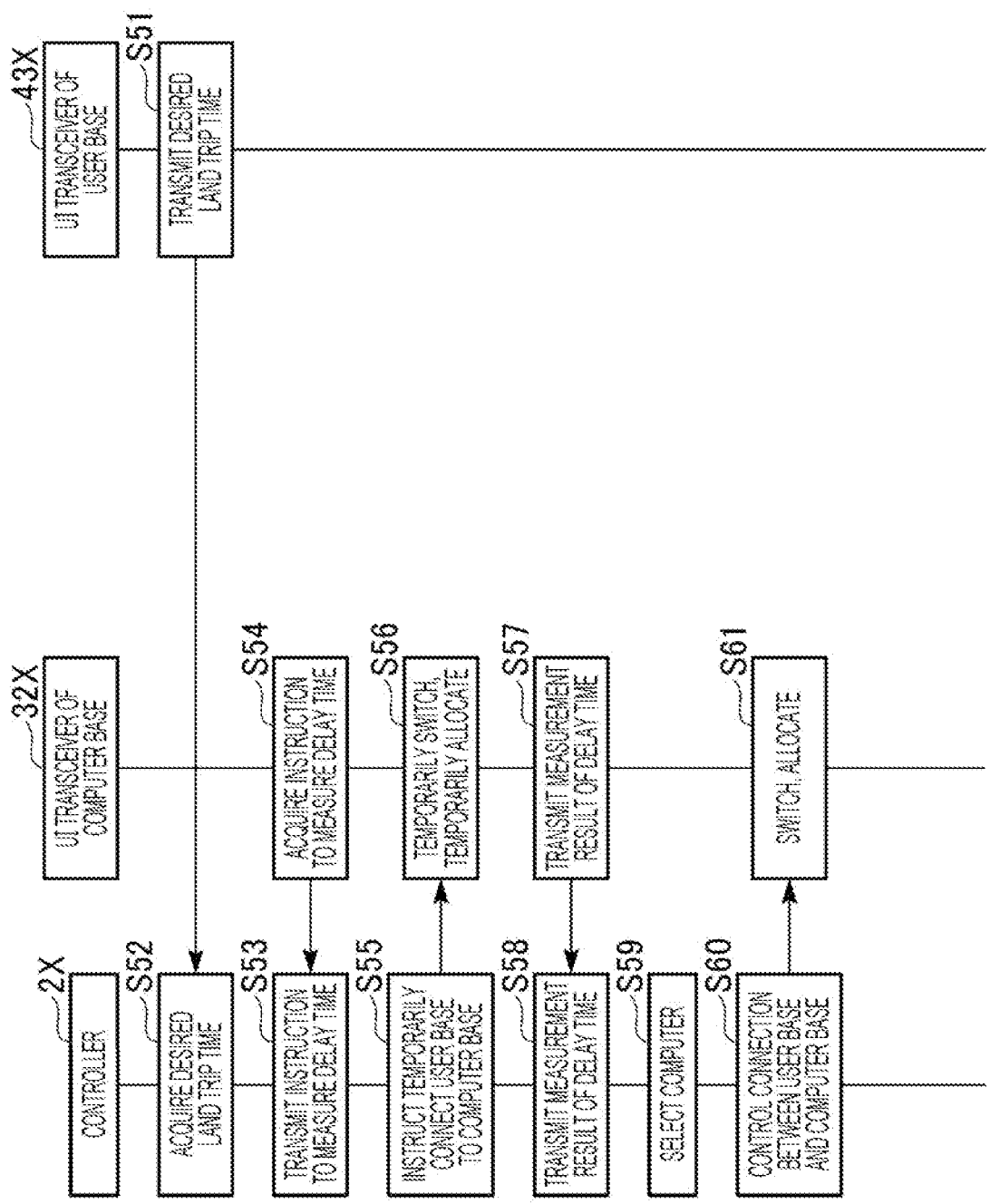
FIG. 7 is a flowchart of a processing procedure example of a computer system according to the second embodiment.

Next, a processing procedure example of the information processing system 1X will be described with reference to FIGS. 5 to 7. FIG. 7 is a sequence diagram of the processing procedure example of a computer system according to the present embodiment.

A user operates a UK device 41 of a user base 4X to input desired land trip time. A UI transceiver 43X transmits the desired land trip time to the controller 2X (step S51). The controller 2X acquires the desired land trip time of the UI transceiver 4 (step S52).

The controller 2X transmits an instruction to measure delay time to the UI transceivers 32X of the computer bases 3X (step S53). The UI transceivers 32X acquire the instruction to measure delay time (step S54).

The controller 2X instructs switchers 34 and allocators 33 of the computer bases 3 so as to temporarily connect the UI transceiver 43 to the UI transceivers 32X of the computer bases 3X in order to measure delay time (step S55).

According to the instruction of the controller 2X, the switchers 34 and the allocators 33 of the computer bases 3X perform switching so as to temporarily connect transmission paths for connection, temporarily allocate the UI transceivers 32X, and temporarily connect the UI transceiver 43X to the UI transceivers 32X (step 356).

The UI transceiver 32X measures delay time between the UI transceivers 32X and the UI transceiver 43X of the user base 4X, and transmits the measurement result obtained by the measuring to the controller 2X (step 357). The controller 2X acquires the measurement result (step S58).

The controller 2X selects a computer 31 to be connected to the UI transceiver 43X of the user base 4X on the basis of the delay time that is the acquired measurement result (step S59).

The controller 2X controls the switchers 34 and the allocators 33 of the computer bases 3 so as to connect the UI transceiver 43 to a selected UI transceiver 32X of a computer base 3X (step S60).

Under the control of the controller 2X, the switchers 34 and the allocators 33 of the computer bases 3X perform switching so as to connect the transmission paths for connection, allocate the UI transceiver 32X, and connect the UI transceiver 43X to the UI transceiver 32X (step S61).

Note that the controller 2X may acquire and store delay time in advance for each combination of the UI transceivers 43X of the user bases 4X and the UI transceivers 32X of the computer bases 3X.

Note that, in a case where a first combination (for example, a UI transceiver 43Xa-1 and a UI transceiver 32Xb-1) is determined, the controller 2X may select, for example, a computer 31 connected to a UT transceiver 43Xb-1 of a user base 4Xb-1 on the basis of the delay time of the first combination. For example, the controller 2X may select a plurality of combinations of the UI transceiver 43Xb-1 of the user base 4Xb-1 and a UI transceiver 32Xb-2 of the computer base 3X-2 corresponding to the acquired delay time.

Alternatively, in a case where the first combination is the UI transceiver 43Xa-1 of the user base 4Xa-1 and the UI transceiver 32Xb-1 of a computer base 3X-1, for example, a target to be connected to the UI transceiver 43Xb-1 of another user base 4Xb-1 may be selected from another UI transceiver 32Xa-1 of the same computer base 3X-1 without measuring the delay amount. The reason is because a computer connected to a UK transceiver in the same computer base 3X can be considered to have substantially the same delay amount.

As described above, in the present embodiment, the UI devices 41 and the sensors 42 of the user bases 4 are connected to the computers 31 of the computer bases 3 via the second network NW2 in consideration of delay time. As a result, according to the present embodiment, for example, fairness is achieved in gaming and eSports, and sensors can acquire sensing information at a plurality of points at the same time.

Furthermore, also in the present embodiment, the UI devices and the computers can be installed at physically distant locations, the connection relation can be flexibly changed, and also operational feeling that is comparable to that in a case where the UI devices and the computers are locally provided can be achieved.

First Example

Figure 8:
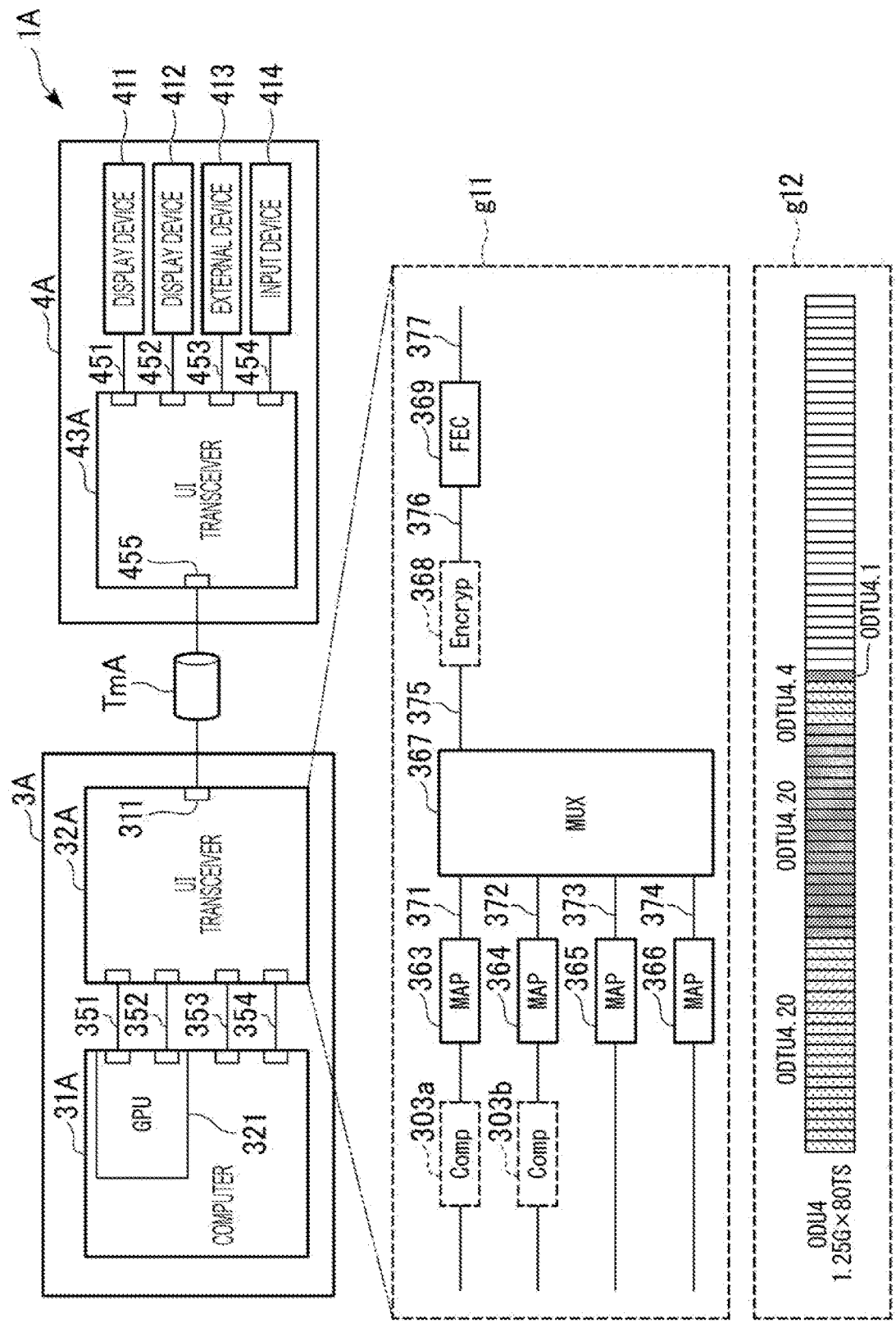
FIG. 8 is a diagram illustrating a specific first configuration example of an information processing system.

FIG. 8 is a diagram illustrating a specific first configuration example of an information processing system. In the example of FIG. 8, a graphic board (including GPU 321) is provided to a computer 31A installed in a computer base 3A, and DisplayPorts axe output as video signals. A plurality of terminals may be provided to the graphic board, and for example, signal lines 351 and 352 of two systems of DisplayPorts may be simultaneously used as illustrated in FIG. 8. Note that a plurality of graphic boards may be provided to one computer, and a plurality of terminals may be used by one user or a plurality of users. Furthermore, the computer 31A exchanges operation information and the like with a USB (for example, USB 2.0 or USB 3.2) terminal via the signal lines 353 and 354. Furthermore, a UI transceiver 32A of the computer base 3A and a UI transceiver 43A of a user base 4A are connected to, for example, an input and output port (I/O) 311 of the QSFP28 standard via a transmission path TmA.

The function of the UI transceiver 32A is implemented in, for example, an application specific integrated circuit (ASIC) or a field programmable gate array (FPGA). FIG. 8 illustrates an example in which various signals are accommodated and multiplexed in an OTN using an FPGA in the UI transceiver 32A.

A signal transmitted from the UI transceiver 32A is transmitted through the optical fiber transmission path TmA and sent to the UI transceiver 43A of the user base 4A. Note that the transmission path TmA may be single-core bidirectional or double-core bidirectional. In addition, transmission paths may be different depending on the transmission direction, and accordingly, for example, a downstream transmission path may be a passive optical network (PON), and an upstream transmission path may be a transmission path of the fourth generation communication standard or the fifth generation communication standard.

The UI transceiver 43A restores the original signals by reverse processing to that of the transmission side. The restored signals, here, the signals of Display Ports 451 and 452, a USB 3.0 (413), and a USB 2.0 (414) are output from the UI transceiver 43A, and are, respectively, connected to a display device 411, a display device 412, an external device 413, and an input device 414. Examples of the external device 413 that is a USB device and the input device 414 that is a USB device include input and output equipment such as keyboards, mice, and gaming controllers, mass storage devices, audio interfaces, cameras, and various sensors. Note that the equipment connected to the UI transceiver 43A is not limited thereto. Also in the following configuration examples, equipment similarly connected to a UI transceiver of a user base is not limited thereto.

Although the flow of a signal from the UI transceiver 32A of the computer base 3A to the UI transceiver 43A of the user base 4A has been described, data can be transferred in the reverse direction by similar signal processing.

Next, an example in which the UI transceiver 32A is implemented in an FPGA will be described with reference to FIG. 8. Note that in an implementation g11 and the following examples, Comp is an abbreviation for compression, MAP is an abbreviation for mapping, MUX is an abbreviation for multiplexing, Encryp is an abbreviation for encryption, and FEC is an abbreviation for forward error correction.

The FPGA implements a function of an OTN as illustrated in the implementation g11. There are various conceivable resolutions, refresh rates, and color depths of video signals, and, for example, in a case of 4K resolution, 120 (frames per second) (fps), and 24 (bits per pixel) (bpp) in a DisplayPort 1.4, the bit rate is about 26 (Gbps). Compression/decompression units (comps) 303 (303a, 303b) compress the signals as necessary. The compression is performed by, for example, VESA DSC. In a case where the VESA DSC is used, 3:1 compression is performed, and the bit rate can be reduced to about 8.7 (Gbps). In a case where the compression is not performed, there is an advantage of low latency because time for the compression processing is saved, but on the other hand, the transfer capacity increases. On the other hand, in a case where the compression is performed, the compression processing takes time, and thus the latency increases as compared with the case of non-compression, but there is an advantage that the transfer capacity can be reduced.

Note that the bit rate of an image is, for example, 4.67 (Gbps) in a case of 1080p 240 (Hz) DSC, 8.61 (Gbps) in a case of 4K 120 (Hz) 24 (bpp) DSC, and 49.65 (Gbps) in a case of 8K 60 (Hz) 24 (bpp).

Here, processing in the case of non-compression will be described.

DisplayPort signals are accommodated in ODU frames by the mapping function (MAPs 363 to 366) of the OTN. Note that mapping/demapping units 304 have the mapping function. For the mapping, for example, a bit-synchronous mapping procedure (BMP), an asynchronous mapping procedure (AMP), or a generic mapping procedure (GMP) defined by the OTN can be applied.

The signals accommodated in the ODU are multiplexed into a high-order ODU frame by a multiplexing function (MUX 367) of the OTN. When about 26 (Gbps) signals are multiplexed in a case where the high-order ODU is an ODU4, since the size of a tributary slot of the ODU4 is 1.302 (Gbps), the signals can be multiplexed into 20 tributary slots, that is, an ODTU4.20. In the implementation g11, for example, multiplexing hierarchy of the MAPs 363 to 365 and the MUX 367 is ODUflexes (371 to 373), and multiplexing hierarchy of the MAP 366 and the MUX 367 is an ODU0 (374). Furthermore, multiplexing hierarchy of the MUX 367 and an Ercryp 368, multiplexing hierarchy of the Encryp 368 and an FEC 369, and multiplexing hierarchy of an FEC 377 and the I/O 311 of the QSFP28 standard are ODU4s (375, 376, 377). Note that the Encryp 368 performs encryption processing. The FEC 369 performs error correction coding processing.

Here, USB signals will be described.

In the example of FIG. 8, a USB 3.0 signal and a USB 2.0 signal are illustrated. The bit rate of the USB 3.0 signal is 5 (Gbps), and the bit rate of the USB 2.0 signal is 480 (Mbps). Similar to the case of a DisplayPort, these USB signals are first accommodated in ODU frames by the mapping function of the OTN, and then multiplexed into a required number of tributary slots of the high-order ODU frame. In a case where the high-order ODU is an ODU4, the USB 3.0 signal can be multiplexed into 4 tributary slots, and the USB 2.0 signal can be multiplexed into 1 tributary slot.

An example of usage of the tributary slots of the ODU4 is illustrated in an area surrounded by a reference sign g12 in FIG. 8. As long as there is an empty tributary slot, signals other than those illustrated here can be multiplexed. After the multiplexing, an ODU is encrypted as necessary, and then an error correction code (FEC) is assigned to the ODU and output as an OTU4 signal from the UI transceiver. In order to transmit and receive the OTU4 signal to and from the UI transceiver 32A, for example, a 100G optical module of the QSFP28 standard or an electric cable including QSFP26 connectors at both ends (direct attachment cable [DAC]) can be used.

Second Example

Figure 9:
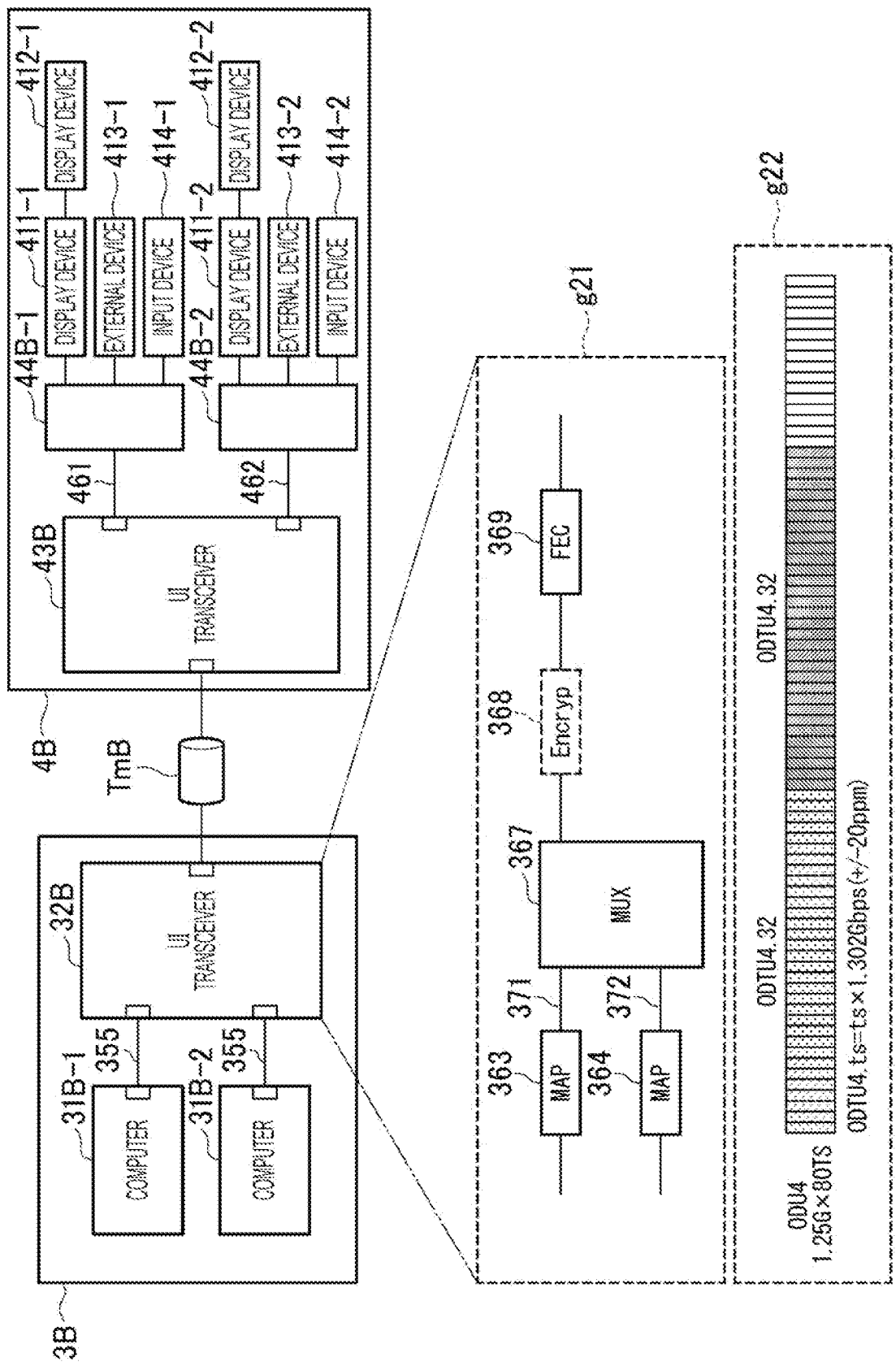
FIG. 9 is a diagram illustrating a specific second configuration example of an information processing system.

FIG. 9 is a diagram illustrating a specific second configuration example of an information processing system. In the example of FIG. 9, signal lines 355 of computers 31B (31B-1, 318-2) in a computer base 3B are signal lines through which signals of the Thunderbolt 3 standard are transmitted. The computers 31B and a UI transceiver 32B are connected by the signal lines 355. Note that, in a Thunderbolt 3, since a video signal, a USB signal, and the like are multiplexed, both the video signal and the USS signal can be transmitted and received only by the Thunderbolt 3 being transferred. As in an area surrounded by a reference sign 922 in FIG. 9, Thunderbolt 3 signals are accommodated in ODU frames similarly to the first example, then multiplexed into a high-order ODU, and transmitted from the UI transceiver 32B to a user base 48.

Note that, as illustrated in FIG. 9, the UI transceiver 32B may be connected to a plurality of the computers 31B (31B-1, 31B-2), and signals from the computers 31B may be multiplexed and transmitted.

A transmission path TmB between the computer base 3B and the user base 48 is, fox example, an OTU4 or an OTL4.4.

The UI transceiver 43B of the user base 4B is connected to Thunderbolt 3 docks 44B (44-1, 44B-2). The Thunderbolt 3 docks 446 demultiplex the multiplexed signals. One or a plurality of display devices 411 (411-1, 411-2) and 412 (412-1, 412-2), external devices 413 (413-1, 413-2) that are USB 3.0 devices, and input devices 414 (414-1, 414-2) such as keyboards and mice are connected to the Thunderbolt 3 docks 44B.

Third Example

Figure 10:
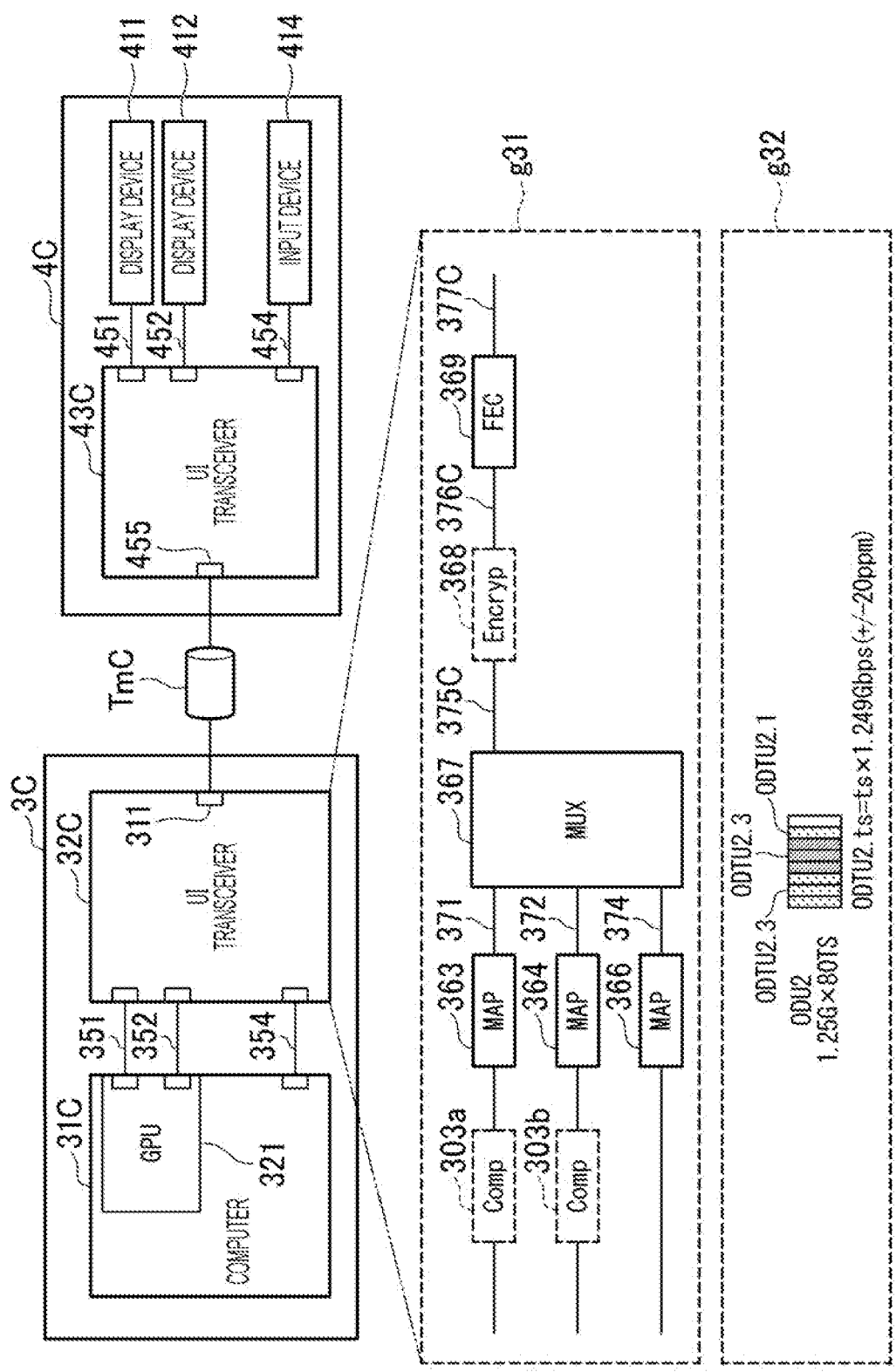
FIG. 10 is a diagram illustrating a specific third configuration example of an information processing system.

FIG. 10 is a diagram illustrating a specific third configuration example of an information processing system. In the example of FIG. 10, signals of two systems of Display Ports are input and output to and from computers 31C in a computer base 3C via signal lines 351 and 352, and a signal of one system of a USB 2.0 is input and output via a signal line 354. These signals are input to a UI transceiver 32C. In this example, a case where video signals are 1080p, 60 (fps), and 24 (bpp) is illustrated. In this case, the bit rate of the video signals is about 3.2 (Gbps). USB 2.0 is 480 (Mbps).

These signals are first mapped to ODU frames as in the first and second examples. The ODU signals are multiplexed into a high-order ODU. Here, an ODU2 signal is used as the high-order ODU. The capacity of a tributary slot of the ODU2 is 1.249 (Gbps), and, as in an area surrounded by a reference sign g32 in FIG. 10, the ODUs including mapped signals are multiplexed into a necessary number of tributary slots. An ODU in which a DisplayPort is accommodated is multiplexed into 3 tributary slots, that is, an ODTU2.3. An ODU in which a USE 2.0 is accommodated is multiplexed into 1 tributary slot, that is, an ODTU2.1.

As in an area surrounded by a reference sign g31 in FIG. 10, the UI transceiver 32C encrypts the ODU2 signal as necessary, assigns an error correction code to the ODU2 signal, and then transmits the OTU2 signal, for example, from an optical module 311C of 10 (Gbps) called small form-factor pluggable plus (SFP+).

A transmission path TmC between the computer base 3C and a user base 4C is, for example, an OTU2 (LR). Note that the transmission path TmC may be single-core bidirectional or double-core bidirectional.

A UI transceiver 43C of the user base 4C restores the original signals by reverse processing to that of the transmission side. The restored signals, here, the signals of Display Ports 451, 452, a USB 2.0 (454) are output from the UI transceiver 43C, and are, respectively, connected to the display devices 411 and 412 and the input device 414 that is a USB 2.0 device.

Fourth Example

Figure 11:
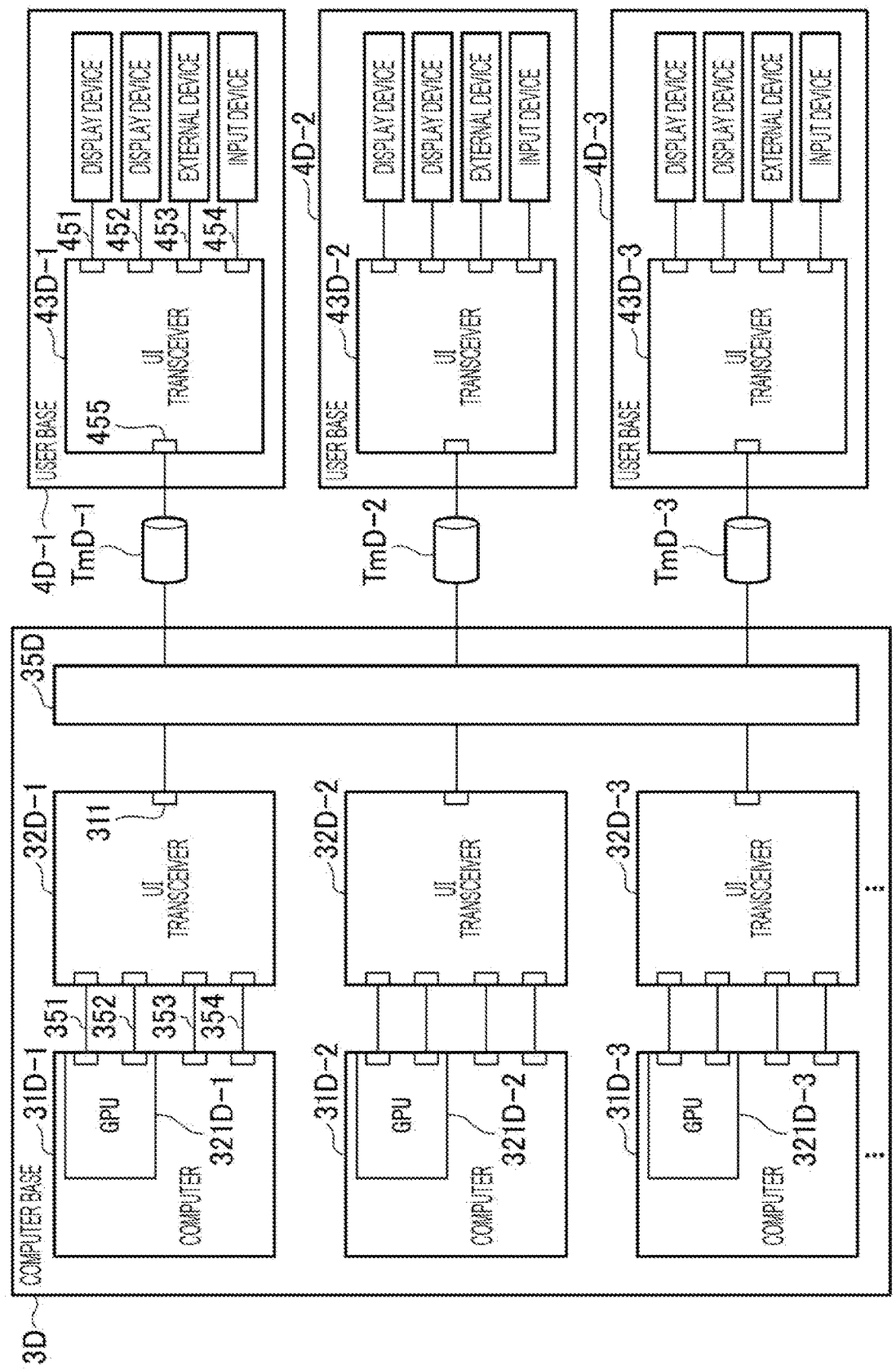
FIG. 11 is a diagram illustrating a specific fourth configuration example of an information processing system.

FIG. 11 is a diagram illustrating a specific fourth configuration example of an information processing system. In the example of FIG. 11, a plurality of computers 31D (31D-1, 31D-2, 310-3, . . . ) and a plurality of UI transceivers 32D (32D-1, 32D-2, 32D-3, . . . ) are installed in a computer base 30.

In this example, performance of graphic board GPUs 321D (321D-1, 321D-2, 321D-3) of three computers 31D-1, 31D-2, and 31D-3 is different. For example, a GPU 321D-1 is a high performance graphic board, a GPU 321D-2 is a medium performance graphic board, and a GPU 321D-3 is a low performance graphic board.

Similarly to the first to third examples, the computers 31D are connected to the respective UI transceivers 32D. An optical switch 35D (switch) La connected to output of the UI transceivers 32D. The optical switch is, for example, a robot patch panel that changes connection relation of optical connectors by operating a robot arm. The optical switch is connected to each of transmission paths TmD (TmD-1, TmD-2, TmD-3, . . . ), and is connected to UI transceivers 43D (43D-1, 43D-2, 43D-3, . . . ) of user bases 4D (4D-1, 4D-2, 4D-3, . . . ). Note that the transmission paths TmD are, for example, OTU4s or OTL4.4s (LR4).

The UI transceivers 43D of the user bases 4D are connected to display devices, for example, external devices that are USB 3.0 devices, or, for example, input devices that are USB 2.0 devices, similarly to the first to third examples.

Here, in a case where a user uses graphic performance that is high performance at first time, a computer 31D to be used can be selected by connection relation between the UI transceivers 32D and the UI transceivers 43D being changed by the optical switch 35D under the control of a controller 2 (or 2X).

In a case where the same user uses a computer for an application sufficient with graphic performance that is low performance at second time, a suitable computer 31D can be used by connection relation between the UI transceivers 32D and the UI transceivers 43D being changed by the optical switch under the control of the controller 2 (or 2X).

Fifth Example

Figure 12:
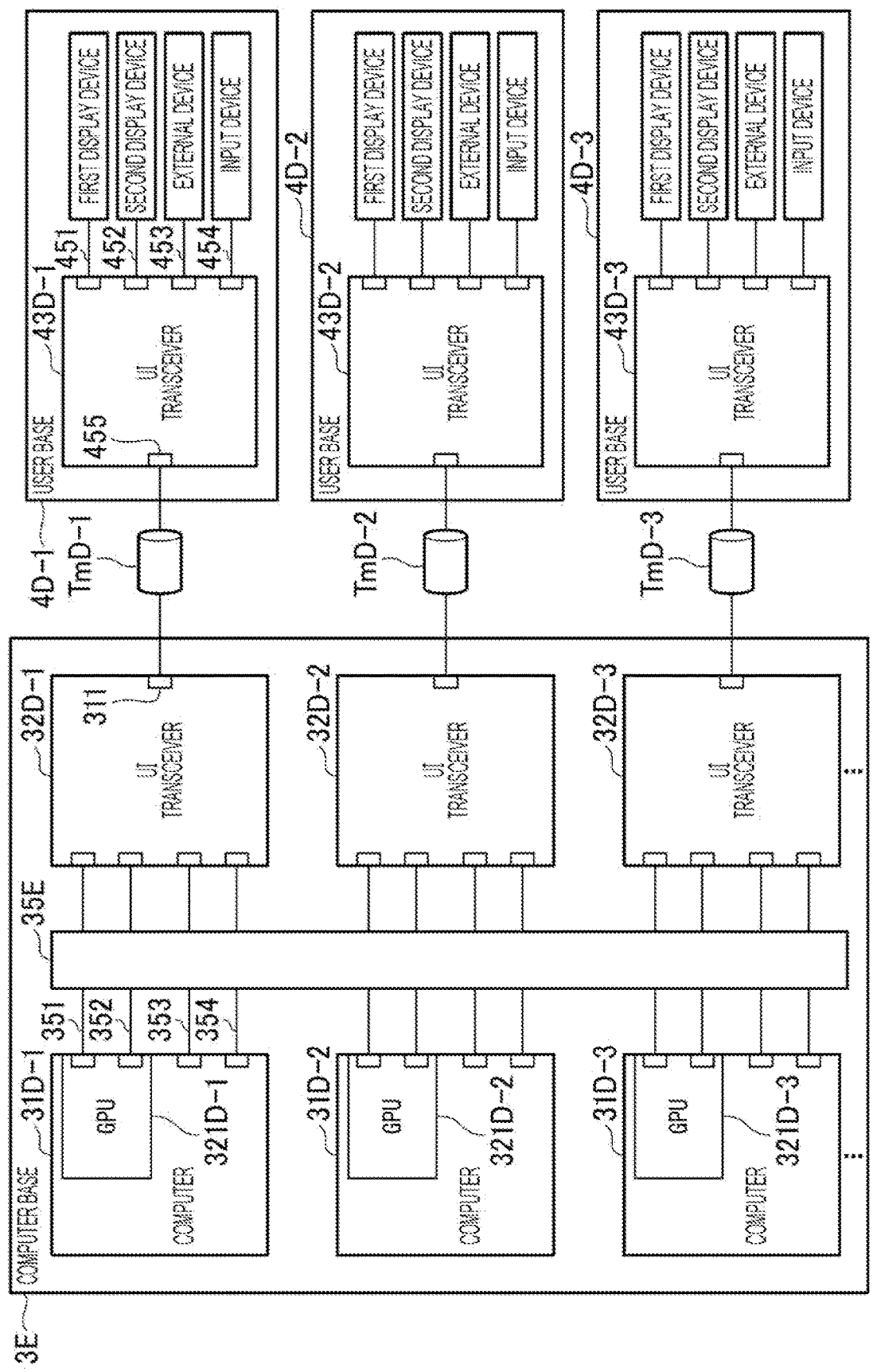
FIG. 12 is a diagram illustrating a specific fifth configuration example of an information processing system.

The mechanism for changing computers to be used is not limited to the configuration using the optical switch 35D illustrated in FIG. 11 of the fourth embodiment. FIG. 12 is a diagram illustrating a specific fifth configuration example of an information processing system. In the example of FIG. 12, a switch 35E is provided between computers 31D (31D-1, 31D-2, 31D-3, . . . ) and UI transceivers 32D (32D-1, 32D-2, 32D-3, . . . ) of a computer base 3E. The switch 35E is, for example, a display (DP), a USB switch, and the like, and performs switching under the control of a controller 2 (or 2X).

Sixth Example

Figure 13:
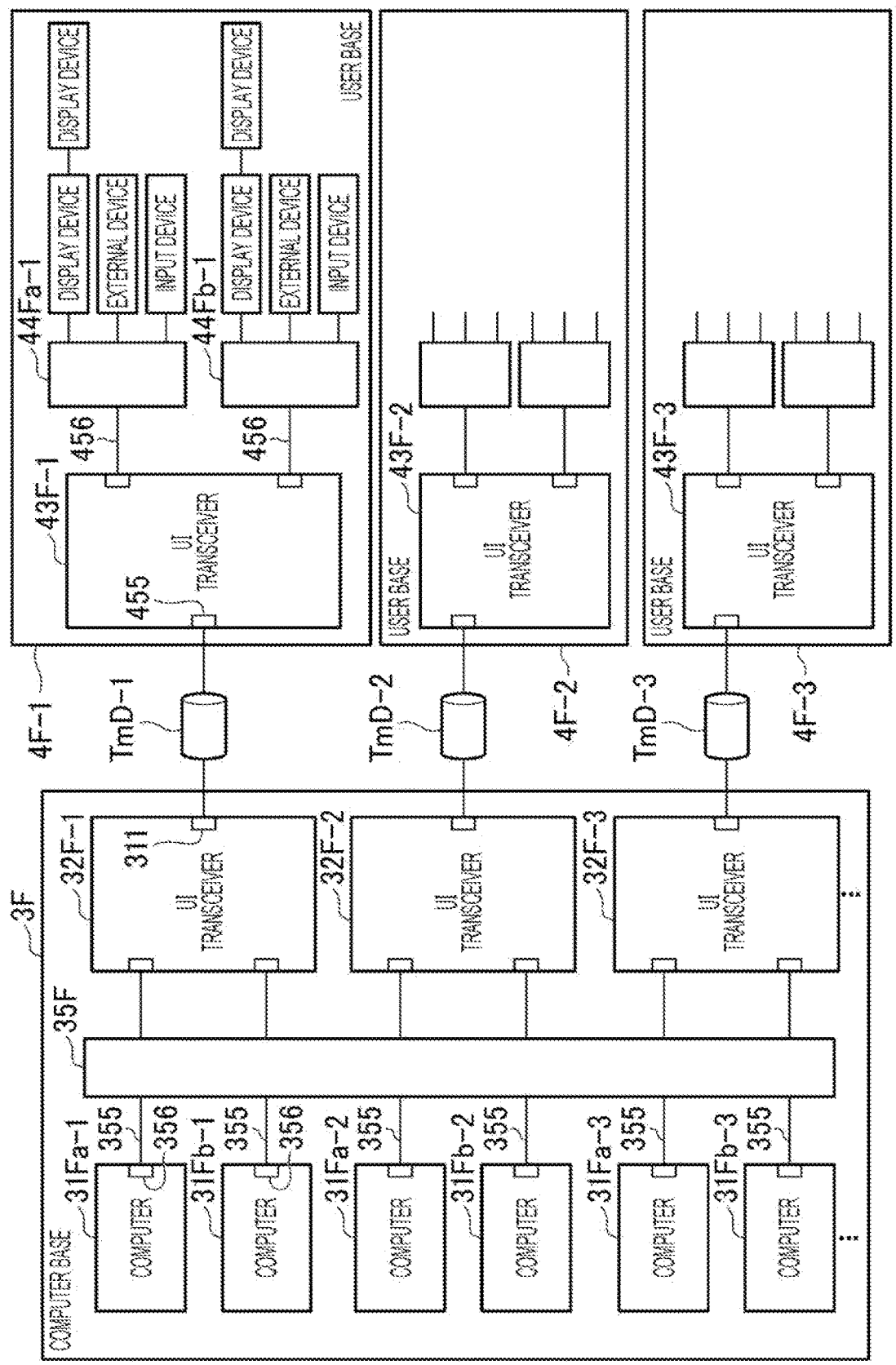
FIG. 13 is a diagram illustrating a specific sixth configuration example of an information processing system.

Furthermore, the optical switch 35D illustrated in FIG. 11 of the fourth example may be a Thunderbolt 3 switch 35F (switch) as illustrated in FIG. 13. FIG. 13 is a diagram illustrating a specific sixth configuration example of an information processing system. In the example of FIG. 13, the Thunderbolt 3 switch 35F is provided between computers 31F (31Fa-1, 31Fb-1, 31Fa-2, 31Fb-2, 31Fa-3, 31Fb-3, . . . ) and UI transceivers 32F (32F-1, 32F)-2, 32F-3, . . . ) of a computer base 3F.

In this case, output ports 356 of the computers 31F are, for example, USB Type-C, and the computers 31F and the Thunderbolt 3 switch 35F are connected by signal lines 355 of the Thunderbolt 3 standard or the like.

Note that, for example, computers 31F-1 (31Fa-1, 31Fb-1) are high performance graphic boards, computers 31F-2 (31Fa-2, 31Fb-2) are medium performance graphic boards, and computers 31F-3 (31Fa-3, 31Fb-3) are low performance graphic boards.

Furthermore, in user bases 4F (4F-1, 4F-2, 4F-3, . . . ), ports of UI transceivers 43F (43F-1, 43F-2, 43F-3, . . . ) are connected to Thunderbolt 3 docks 44F (44Fa-1, 44Fb-1, 44Fa-2, 44Fb-2, 44Fa-3, 44Fb-3, . . . ) via signal lines 456. Note that switching control of the Thunderbolt 3 docks 44F is performed by a controller 2 (or 2X). Furthermore, the configurations of the user bases 4F-1, 4F-2, and 4F-3 may be the same or different.

Seventh Example

Figure 14:
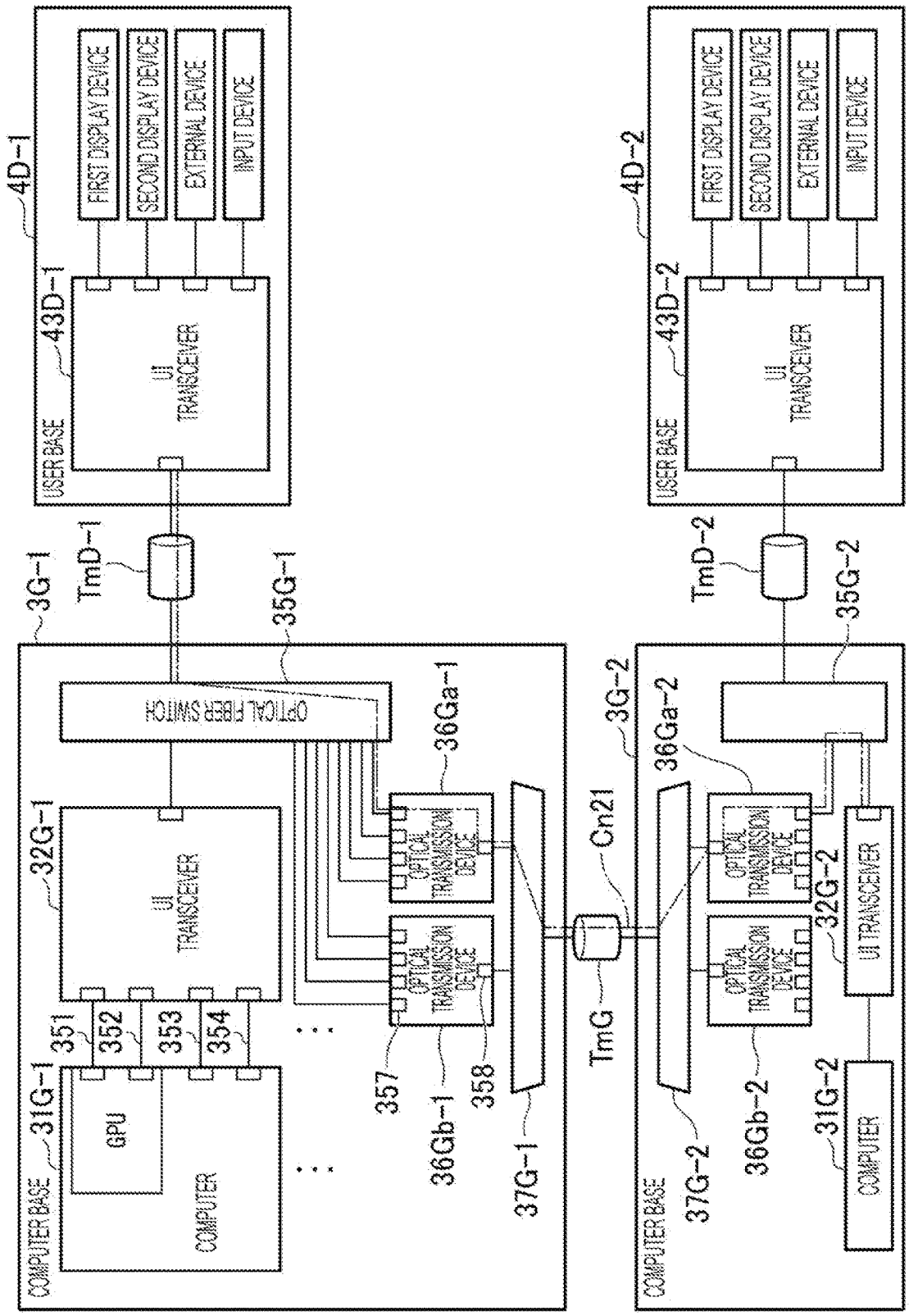
FIG. 14 is a diagram illustrating an example of a specific seventh configuration of an information processing system in which a plurality of computer bases is connected to each other.

FIG. 14 is a diagram illustrating an example of a specific seventh configuration of an information processing system in which a plurality of computer bases is connected to each other.

Here, with reference to FIG. 14, a case where a user of a user base 4D-1 tries to use a computer 31G having desired performance, but all computers 31G having the performance requested by the user are used by other users and there is no availability in a computer base 3G-1 directly connected to the user base 4D-1 by a transmission path, or a case where such a computer 31G is not installed will be described.

In this case, it is assumed that a computer 31G having performance desired by the user is installed in a computer base 3G-2 and is available.

At that time, a signal from a UI transceiver 43D-1 of the user base 40-1 is connected to an optical switch 35G-1 of the computer base 3G-1 directly connected via a transmission path TmD-1 as indicated by a dashed line of a path Cn21 under the control of a controller 2 (or 2X). Then, in the computer base 3G-1, the signal is sent to an optical transmission device 36Ga-1 for communication with the computer base 3G-2 in which the computer 31G having desired performance by the user is installed. In the computer base 3G-1, after the optical transmission device 36Ga-1, optical multiplexing is performed by an optical multiplexing device 37G-1 as necessary, and the signal reaches the computer base 3G-2.

In the computer base 3G-2, the signal is demultiplexed by an optical multiplexing device 37G-2, and the demultiplexed signals are input to an optical transmission device 36Ga-2 and connected to a UI transceiver 32G-2 via an optical fiber switch 35G-2.

Ports of optical transmission devices 36G (36Ga-1, 36Gb-1, 36Ga-2, 36Gb-2) connected to optical switches 35G (35G-1, 35G-2) (switches) are, for example, ports of the QSFP28 standard. Furthermore, ports of the optical transmission devices 36G (36Ga-1, 36Gb-1, 36Ga-2, 36Gb-2) connected to optical multiplexing devices 37G (37G-1, 37G-2) are, for example, ports of the QSFP56-DD standard.

Furthermore, the optical switches 35G (35G-1, 35G-2) are, for example, optical fiber switches, robot patch panels, or the like. Furthermore, computer bases 3G are connected to each other by a transmission path TmG. The transmission path TmG is, for example, an optical fiber cable or the like through which a signal of 400G-ZR (DWD4) or the OTU4 standard is transmitted.

Note that, in FIG. 14, the flow of a signal has been described only in one direction, but the flow in the opposite direction is similar. The configuration described above enables connection to a UI transceiver 32G of another computer base 3G, and resources of computers 31G having desired performance can be interchanged.

Eighth Example

Figure 15:
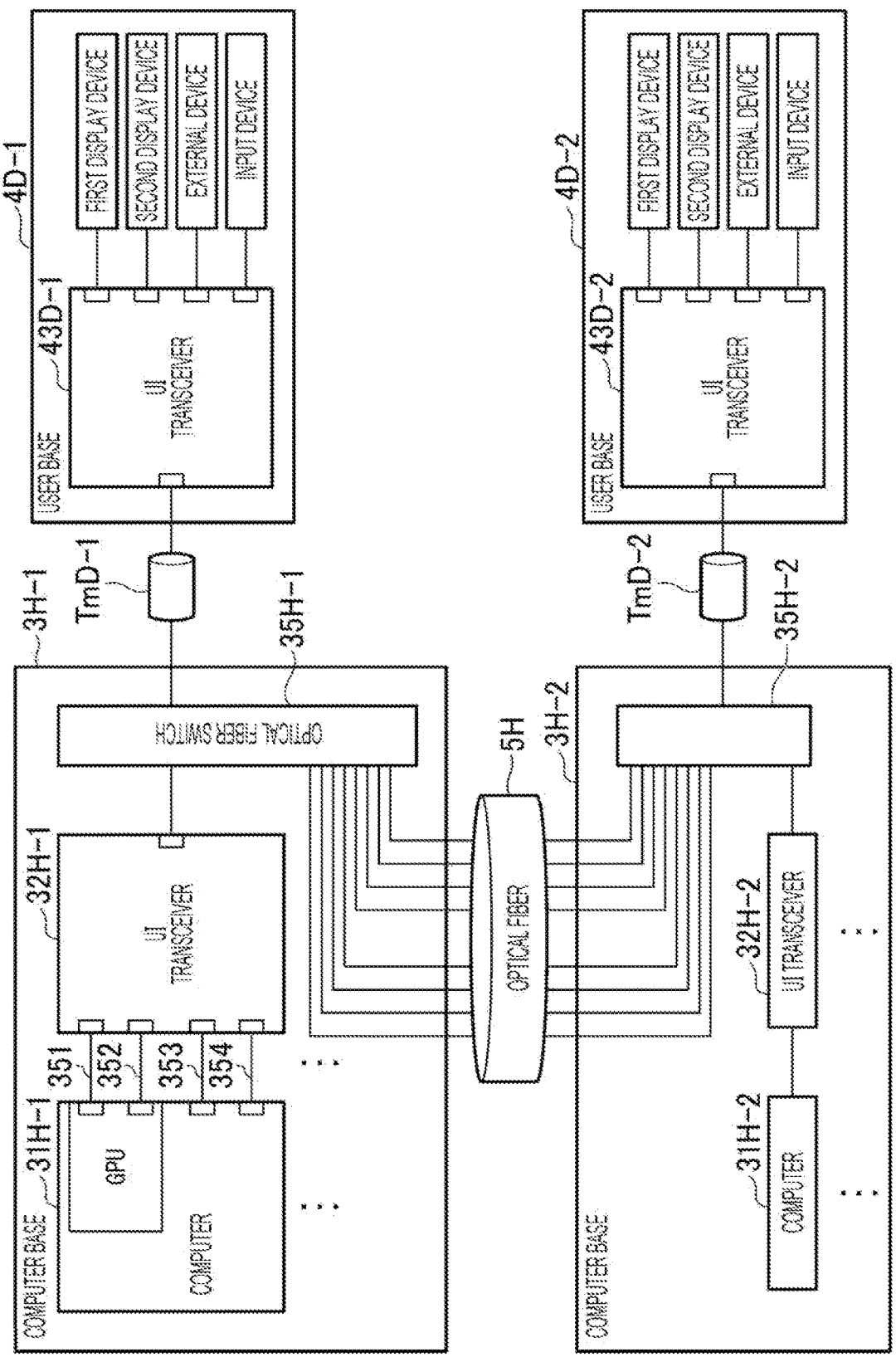
FIG. 15 is a diagram illustrating another connection example that is a specific eighth configuration example of an information processing system in which adjacent computer bases are connected.

FIG. 15 is a diagram illustrating another connection example that is a specific eighth configuration example of an information processing system in which adjacent computer bases are connected.

In this example, computer bases 3H (3H-1, 3H-2) are connected by a transmission medium 5H such as a multicore optical fiber or a multicore fiber. By the transmission medium 5H, for example, a UI transceiver 43D-1 of a user base 4D-1 and a UI transceiver 32H-2 of a computer base 3H-2 can be connected. Note that the transmission medium 5H may be a multi-path.

Ninth Example

Figure 16:
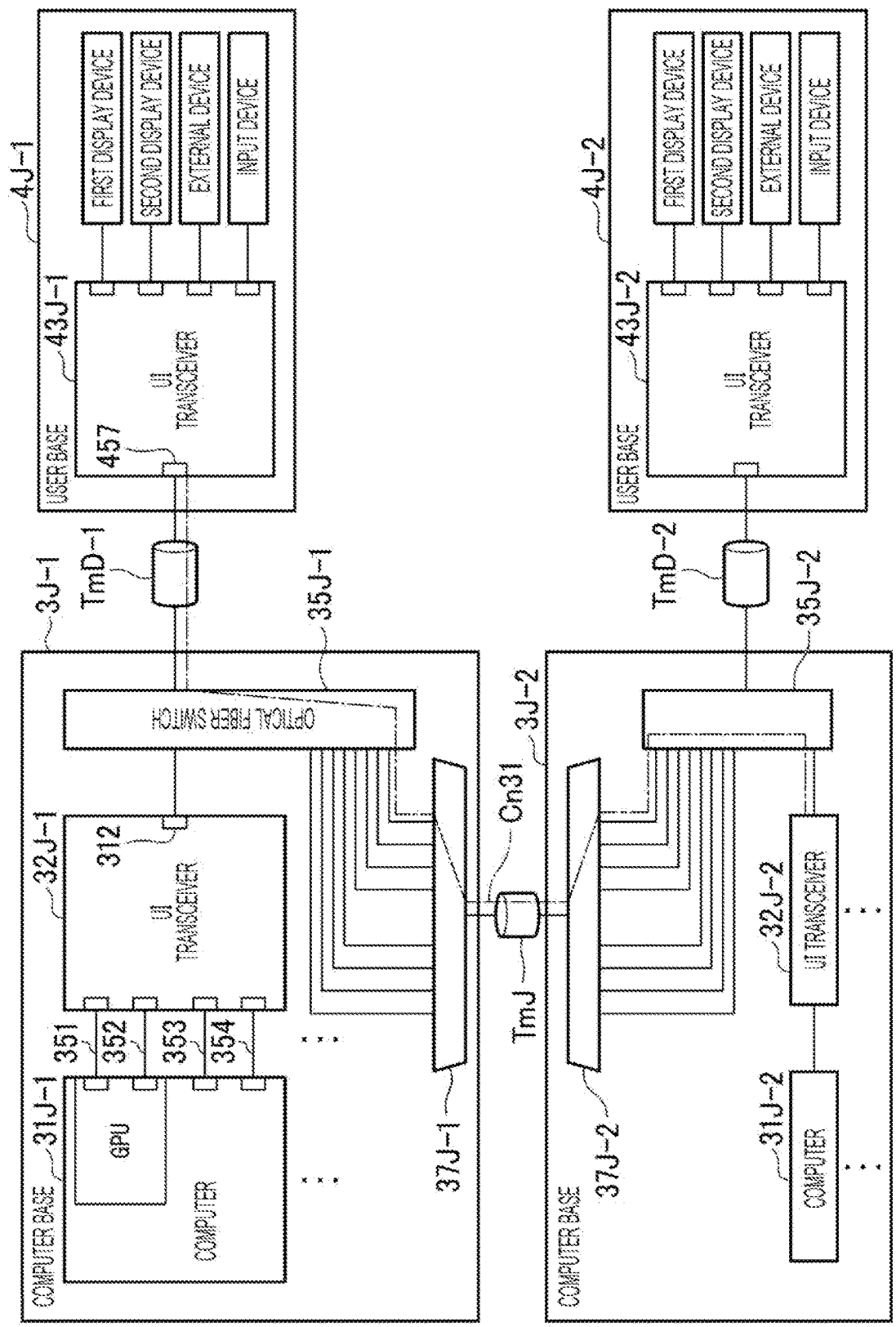
FIG. 16 is a diagram illustrating another connection example that is a specific ninth configuration example of an information processing system in which adjacent computer bases are connected.
Figure 17:
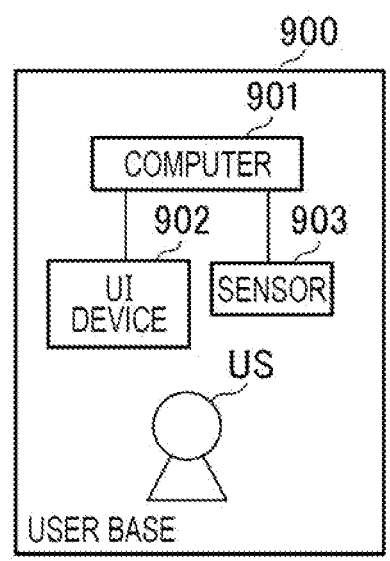
Figure 18:
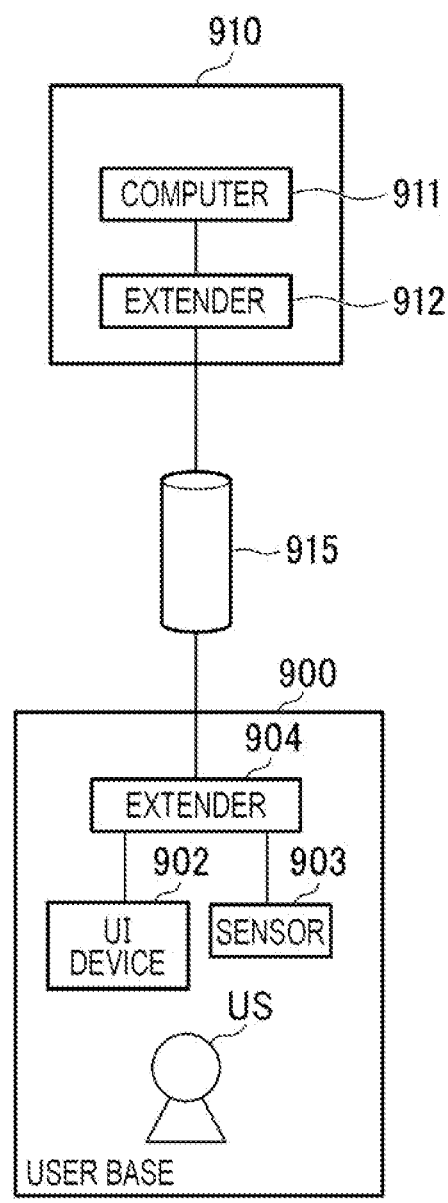
FIG. 18 is a diagram illustrating an example of connection between a UI device and a computer using extenders in the related art.
Figure 19:
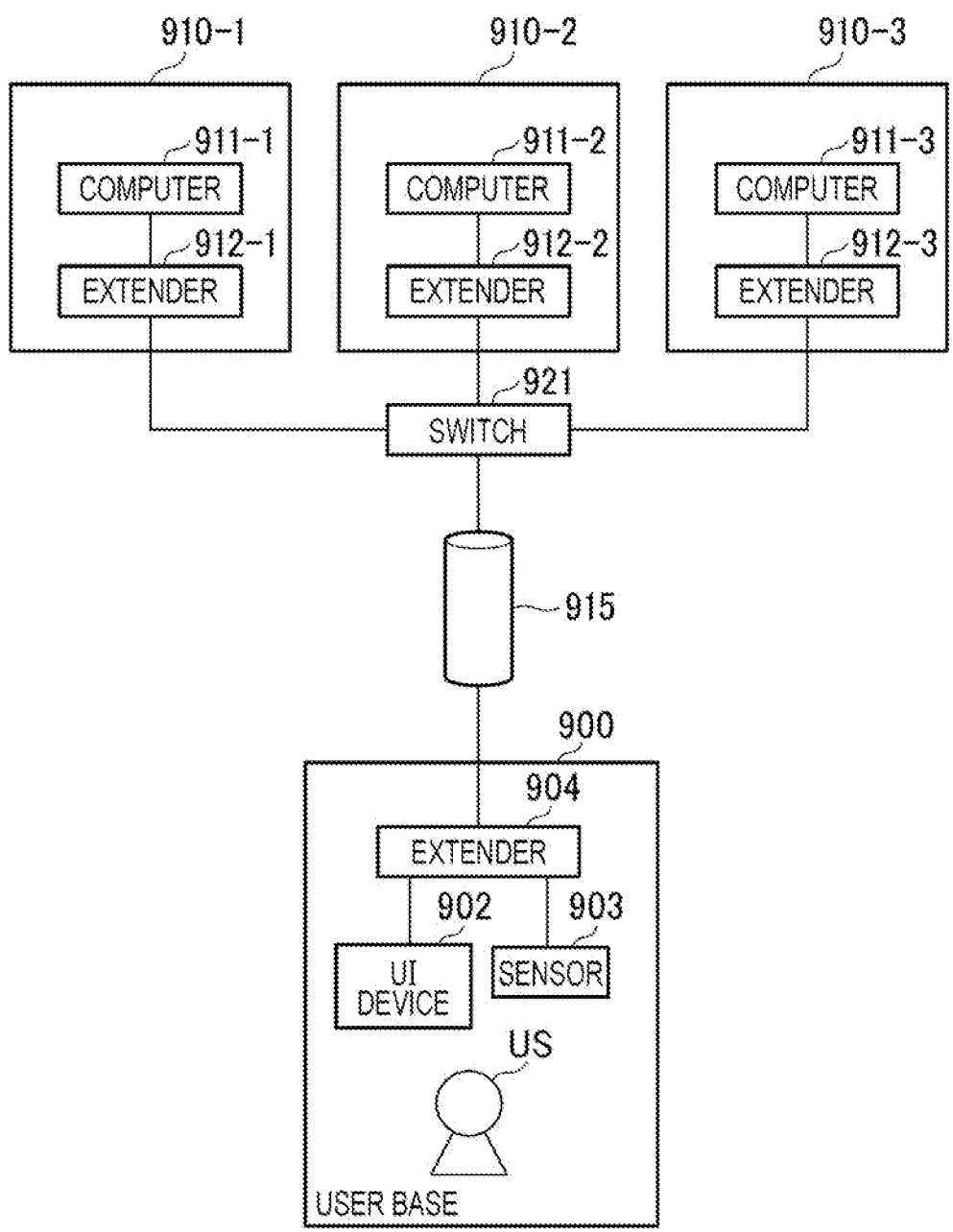
FIG. 19 is a diagram illustrating another example of connection between a UI device and computers using extenders in the related art.
Figure 20:
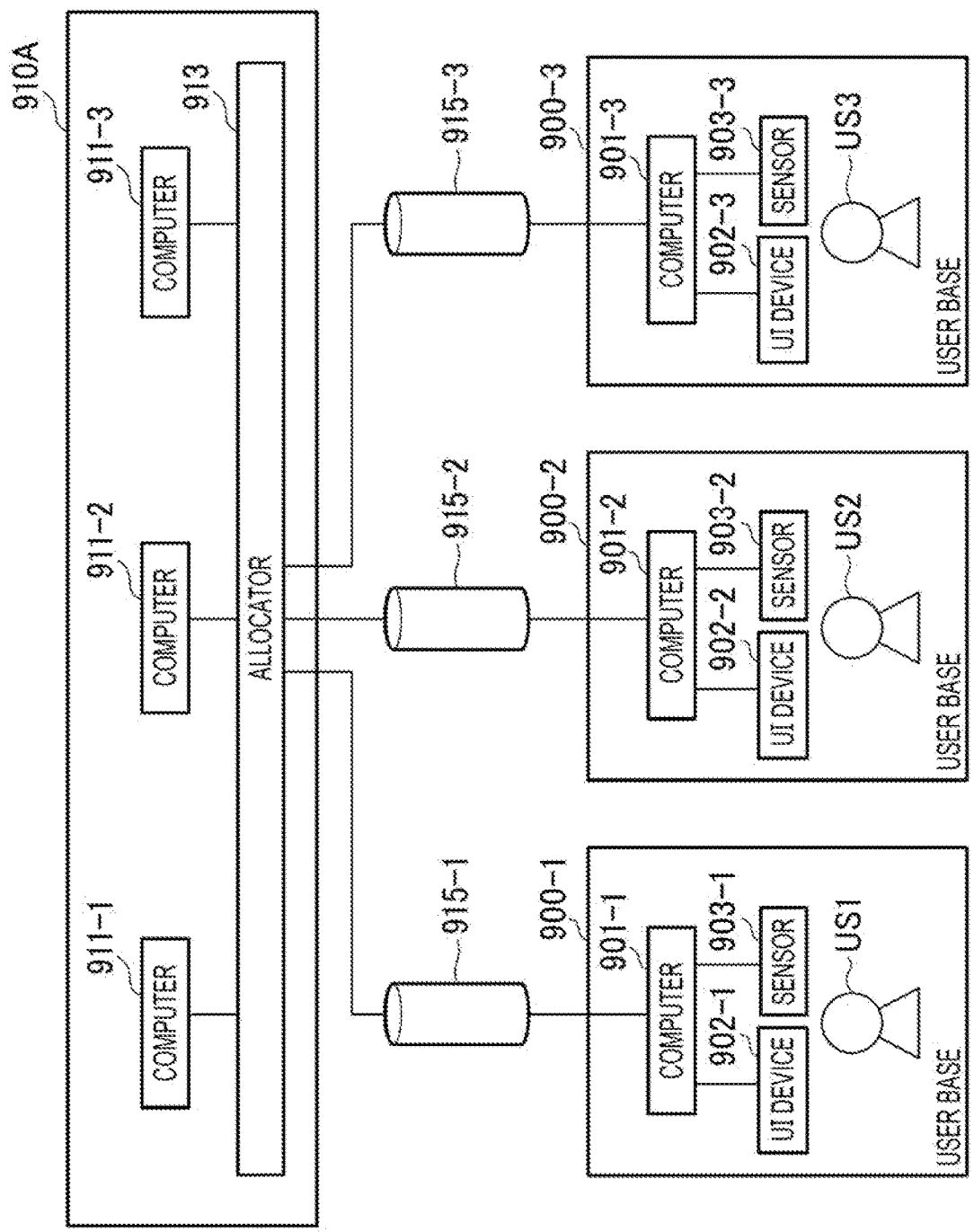
FIG. 20 is a diagram illustrating a configuration example of remote desktops in the related art.

FIG. 16 is a diagram illustrating another connection example that is a specific ninth configuration example of an information processing system in which adjacent computer bases are connected.

In this example, UI transceivers 43J (43J-1, 43J-2) of user bases 4J (4J-1, 4J-2) include WDM interfaces.

As in a path Cn31, a signal from the UI transceivers 434 reaches an optical switch 35J-1 of a computer base 3J-1 to which a user base 4J-1 is directly connected via transmission paths TmD (TmD-1, TmD-2). Note that optical switches 35J (35J, 35J-2) (switches) may be optical switches, robot patch switches, or the like. The signal is switched by the optical switch 35J-1, input to an optical multiplexing device 37J-1 or a reconfigurable optical add drop multiplexer (ROADM) so as to be transmitted to an adjacent computer base 3J-2, and transmitted to the adjacent computer base 3J-2. The transmitted signal is demultiplexed by an optical multiplexing device 37J-2 or an ROADM, and is connected to a desired UI transceiver 32J-2 via an optical fiber switch 35J-2.

Note that UI transceivers 32J (32J-1, 323-2) of computer bases 3J (3J-1, 3J-2) are connected to the optical switches 35J via C form-factor pluggable (CFP) 2 ports 312, for example. Furthermore, the UI transceivers 43J of the user bases 4J are connected to the transmission paths TmD (TmD-1, TmD-2) via CFP2 ports 457, for example.

Furthermore, a transmission path TmJ is, for example, an optical fiber cable and the like through which a signal of the OTU4 (WDM) standard is transmitted.

Note that each of implementations described above is an example, and the implementation configurations are not limited thereto. For example, another device or the like may be connected to the computer bases 3 and the user bases 4.

As above, the embodiments of the present invention have been described in detail with reference to the drawings. On the other hand, the specific configuration is not limited to the embodiments, and includes design and the like without departing from the spirit of the present invention.

INDUSTRIAL APPLICABILITY

The present invention is applicable to, for example, a gaming system, an eSports system, a remote desktop system, a computer rental system, and the like.

REFERENCE SIGNS LIST

1 Information processing system
2 Controller
3 Computer base
4 User base
5 Position detector
31 Computer
32 UI transceiver
33 Allocator
34 Switcher
35, 35E, 35F, 35G, 35H, 35J Switch
36 Optical transmission device
37 Optical multiplexing device
41 UI device
42 Sensor
43 UI transceiver
44 Thunderbolt 3 dock
301 Monitoring control unit
302 UI input and output unit
303 Compression/decompression unit
304 Mapping/demapping unit
305 Multiplexing/demultiplexing unit
304 Transception unit
307 Sensor input and output unit
308 Delay measurement unit
321 GPU
401 Monitoring control unit
402 UI input and output unit
403 Compression/decompression unit
404 Mapping/demapping unit
405 Multiplexing/demultiplexing unit
406 Transception unit
407 Sensor input and output unit
408 Delay measurement unit
NW1 First network
NW2 Second network
Tm Transmission path

The invention claimed is:

1. An information processing system comprising:
a computer installed in a computer base and a first transceiver connected to the computer;
a second transceiver installed in a user base used by a user and a device connected to the second transceiver;
a network configured to perform communication between a plurality of the first transceivers and the second transceiver; and
a controller configured to control connection between one of the plurality of the first transceivers and the second transceiver,
wherein the controller is configured to control connection between one of the plurality of the first transceivers and the second transceiver via the network having a circuit switching function,
wherein
each of the plurality of the first transceivers comprises a first delay measurement unit configured to measure delay time between the first transceiver and the second transceiver,
the second transceiver comprises a second delay measurement unit configured to measure delay time between the first transceiver and the second transceiver, and
the controller is configured to:
acquire the delay time from at least one of the second transceiver or the plurality of the first transceivers; and
determine, as a target to be connected to the second transceiver, the one of the plurality of the first transceivers on a basis of the delay time and predetermined round-trip time, round-trip time between the one of the plurality of the first transceivers and the second transceiver being within the predetermined round-trip time.

2. The information processing system according to claim 1, wherein the controller is configured to select and connect the one of the plurality of the first transceivers having round-trip time of 1/f (sec) or less between the one of the plurality of the first transceivers and the second transceiver in a case where an update frequency of the device is f (Hz).

3. The information processing system according to claim 1, wherein in a case where first connection between one of the plurality of the first transceivers and the second transceiver has been completed, the controller is configured to acquire first delay time between the first transceiver and the second transceiver in the first connection, and determine connection between another second transceiver and another one of the first transceivers corresponding to the acquired first delay time.

4. An information processing method in an information processing system including a computer installed in a computer base, a first transceiver connected to the computer, a second transceiver installed in a user base used by a user, a device connected to the second transceiver, a network configured to perform communication between a plurality of the first transceivers and the second transceiver, and a controller configured to control connection between one of the plurality of the first transceivers and the second transceiver, the information processing method comprising controlling, by the controller, connection between one of the plurality of the first transceivers and the second transceiver via the network having a circuit switching function, wherein each of the plurality of the first transceivers comprises a first delay measurement unit configured to measure delay time between the first transceiver and the second transceiver, the second transceiver comprises a second delay measurement unit configured to measure delay time between the first transceiver and the second transceiver, and the information processing method comprises:

acquiring the delay time from at least one of the second transceiver or the plurality of the first transceivers; and determining, as a target to be connected to the second transceiver, the one of the plurality of the first transceivers on a basis of the delay time and predetermined round-trip time, round-trip time between the one of the plurality of the first transceivers and the second transceiver being within the predetermined round-trip time.

5. A non-transitory computer readable storage medium storing a program that is executed in an information processing system including a computer installed in a computer base, a first transceiver connected to the computer, a second transceiver installed in a user base used by a user, a device connected to the second transceiver, a network configured to perform communication between a plurality of the first transceivers and the second transceiver, and a controller configured to control connection between one of the plurality of the first transceivers and the second transceiver, the program causing a computer of the controller to control connection between one of the plurality of the first transceivers and the second transceiver, wherein each of the plurality of the first transceivers comprises a first delay measurement unit configured to measure delay time between the first transceiver and the second transceiver, the second transceiver comprises a second delay measurement unit configured to measure delay time between the first transceiver and the second transceiver, and the program causes the computer of the controller to:

acquire the delay time from at least one of the second transceiver or the plurality of the first transceivers; and determine, as a target to be connected to the second transceiver, the one of the plurality of the first transceivers on a basis of the delay time and predetermined round-trip time, round-trip time between the one of the plurality of the first transceivers and the second transceiver being within the predetermined round-trip time.

* * * * *